US012609385B2

(12) United States Patent
Hartl

(10) Patent No.: US 12,609,385 B2
(45) Date of Patent: Apr. 21, 2026

(54) ELECTRICAL DEVICE, IN PARTICULAR MICROBATTERY, AND METHOD FOR THE PRODUCTION

(71) Applicant: Schott AG, Mainz (DE)

(72) Inventor: Helmut Hartl, Klosterneuburg (AT)

(73) Assignee: SCHOTT AG, Mainz (DE)

( * ) Notice: Subject to any disclaimer, the term of this patent is extended or adjusted under 35 U.S.C. 154(b) by 725 days.

(21) Appl. No.: 17/946,712

(22) Filed: Sep. 16, 2022

(65) Prior Publication Data

US 2023/0021960 A1     Jan. 26, 2023

Related U.S. Application Data

(63) Continuation of application No. PCT/EP2021/056011, filed on Mar. 10, 2021.

(30) Foreign Application Priority Data

Mar. 17, 2020    (DE) ..................... 10 2020 107 224.4
Nov. 13, 2020    (DE) ..................... 20 2020 106 518.1

(51) Int. Cl.
H01M 50/191        (2021.01)
C03C 10/00          (2006.01)
          (Continued)

(52) U.S. Cl.
CPC ....... H01M 50/191 (2021.01); C03C 10/0054 (2013.01); H01G 11/78 (2013.01);
          (Continued)

(58) Field of Classification Search
CPC ............. H01M 50/191; H01M 50/154; H01M 50/159; H01M 50/169; H01M 50/172;
          (Continued)

(56) References Cited

U.S. PATENT DOCUMENTS 961,672 A     6/1910   Barnhurst
4,158,721 A   6/1979   Decker et al.
          (Continued)

FOREIGN PATENT DOCUMENTS

CN    109980155 A    7/2019
CN    209691814 U    11/2019
          (Continued)

OTHER PUBLICATIONS

Notification of Transmittal of Translation of the International Preliminary Report on Patentability dated Sep. 29, 2022 for International Patent Application No. PCT/EP2021/056011 (12 pages).
          (Continued)

*Primary Examiner* — Adam A Arciero
(74) *Attorney, Agent, or Firm* — TAYLOR & EDELSTEIN, PC

(57)          ABSTRACT

An electrical device includes: a housing part made of a metal and including a feedthrough therethrough, an opening of the feedthrough, a first region, and a second region, the opening receiving a conductive material or a conductor in a glass material or a glass-ceramic material, wherein: (i) the conductive material has a first coefficient of expansion $\alpha_1$, the glass material or the glass-ceramic material has a second coefficient of expansion $\alpha_2$, and the housing part has a third coefficient of expansion $\alpha_3$, the third coefficient of expansion $\alpha_3$ being always greater than the second coefficient of expansion $\alpha_2$; or (ii) the first region including a width W that is substantially perpendicular to the axis of the at least one opening, the width W of the first region being always greater than a thickness $D_2$ and a thickness $D_E$ of the second region; or (iii) a combination of (i) and (ii).

18 Claims, 6 Drawing Sheets

(51) Int. Cl.

| | |
|---|---|
| *H01G 11/78* | (2013.01) |
| *H01G 11/80* | (2013.01) |
| *H01M 50/148* | (2021.01) |
| *H01M 50/159* | (2021.01) |
| *H01M 50/169* | (2021.01) |
| *H01M 50/172* | (2021.01) |
| *H01M 50/184* | (2021.01) |
| *H01M 50/188* | (2021.01) |
| *H01M 50/198* | (2021.01) |
| *H01M 50/342* | (2021.01) |
| *H01M 50/552* | (2021.01) |
| *H01M 50/562* | (2021.01) |
| *H01M 50/564* | (2021.01) |

(52) U.S. Cl.

CPC .......... *H01G 11/80* (2013.01); *H01M 50/154* (2021.01); *H01M 50/159* (2021.01); *H01M 50/169* (2021.01); *H01M 50/172* (2021.01); *H01M 50/184* (2021.01); *H01M 50/188* (2021.01); *H01M 50/198* (2021.01); *H01M 50/3425* (2021.01); *H01M 50/552* (2021.01); *H01M 50/562* (2021.01); *H01M 50/564* (2021.01); *C03C 2204/00* (2013.01); *H01M 2200/20* (2013.01)

(58) Field of Classification Search

CPC ............. H01M 50/184; H01M 50/188; H01M 50/198; H01M 50/3425; H01M 50/552; H01M 50/562; H01M 50/564; H01M 2200/20; H01M 50/14; H01M 50/148; H01M 50/182; H01M 10/058; H01G 11/78; H01G 11/80; H01G 11/74; C03C 2204/00; Y02E 60/10

See application file for complete search history.

(56) References Cited

U.S. PATENT DOCUMENTS

| | | | |
|---|---|---|---|
| 4,841,101 A | 6/1989 | Pollock |
| 5,015,530 A | 5/1991 | Brow et al. |
| 5,773,959 A | 6/1998 | Merritt et al. |
| 5,849,434 A | 12/1998 | Miura et al. |
| 5,853,914 A | 12/1998 | Kawakami |
| 5,874,185 A | 2/1999 | Wang et al. |
| 5,900,183 A | 5/1999 | Kronfli et al. |
| 5,952,126 A | 9/1999 | Lee et al. |
| 6,190,798 B1 | 2/2001 | Okada et al. |
| 6,433,276 B1 | 8/2002 | Bellora |
| 7,687,200 B2 | 3/2010 | Jouanneau-Si-Labri et al. |
| 10,541,392 B2 | 1/2020 | Hartl |
| 10,910,609 B2 | 2/2021 | Hyung et al. |
| 2003/0096162 A1 | 5/2003 | Lasater et al. |
| 2013/0184797 A1 | 7/2013 | Tang et al. |
| 2015/0295349 A1 | 10/2015 | Marzano et al. |
| 2015/0364735 A1 | 12/2015 | Kohira et al. |
| 2016/0133888 A1 | 5/2016 | Hartl |
| 2019/0312239 A1* | 10/2019 | Hartl .................. H01M 50/186 |
| 2021/0280934 A1* | 9/2021 | Hartl .................... H01M 50/15 |

FOREIGN PATENT DOCUMENTS

| | | | |
|---|---|---|---|
| DE | 27 33 948 A1 | 8/1978 |
| DE | 690 23 071 T2 | 6/1996 |
| DE | 101 05 877 A1 | 8/2001 |
| DE | 698 04 378 T2 | 10/2002 |
| DE | 699 23 805 T2 | 7/2005 |
| DE | 10 2007 063 188 A1 | 6/2009 |
| DE | 10 2011 012 430 A1 | 8/2012 |
| DE | 11 2012 000 900 A5 | 11/2013 |
| DE | 10 2013 006 463 A1 | 10/2014 |
| DE | 10 2014 016 601 A1 | 5/2016 |
| DE | 10 2017 221 426 A1 | 5/2019 |
| EP | 0 412 655 A2 | 2/1991 |
| EP | 0 885 874 A1 | 12/1998 |
| EP | 0 954 045 A2 | 11/1999 |
| EP | 3 588 606 A1 | 1/2020 |
| GB | 2 020 888 A | 11/1979 |
| GB | 2 067 345 A | 7/1981 |
| JP | 7-282843 A | 10/1995 |
| WO | 2012/110242 A1 | 8/2012 |
| WO | 2012/110244 A1 | 8/2012 |
| WO | 2012/110246 A1 | 8/2012 |
| WO | 2012/167921 A1 | 12/2012 |
| WO | 2014/176533 A1 | 10/2014 |
| WO | WO-2020104571 A1* | 5/2020 | ............. H01G 11/74 |

OTHER PUBLICATIONS

International Search Report dated Jun. 9, 2021 for International Patent Application Serial No. PCT/EP2021/056011 (5 pages).
"Handbook of Batteries", published by David Linden, 2nd issue, McGrawhill, 1995, Chapters 36 & 39 (88 pages).

\* cited by examiner

Fig.9a
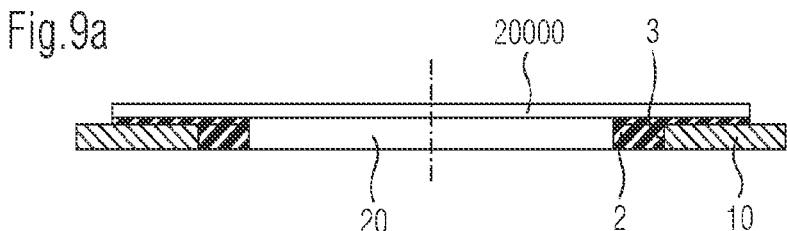
Fig.9c
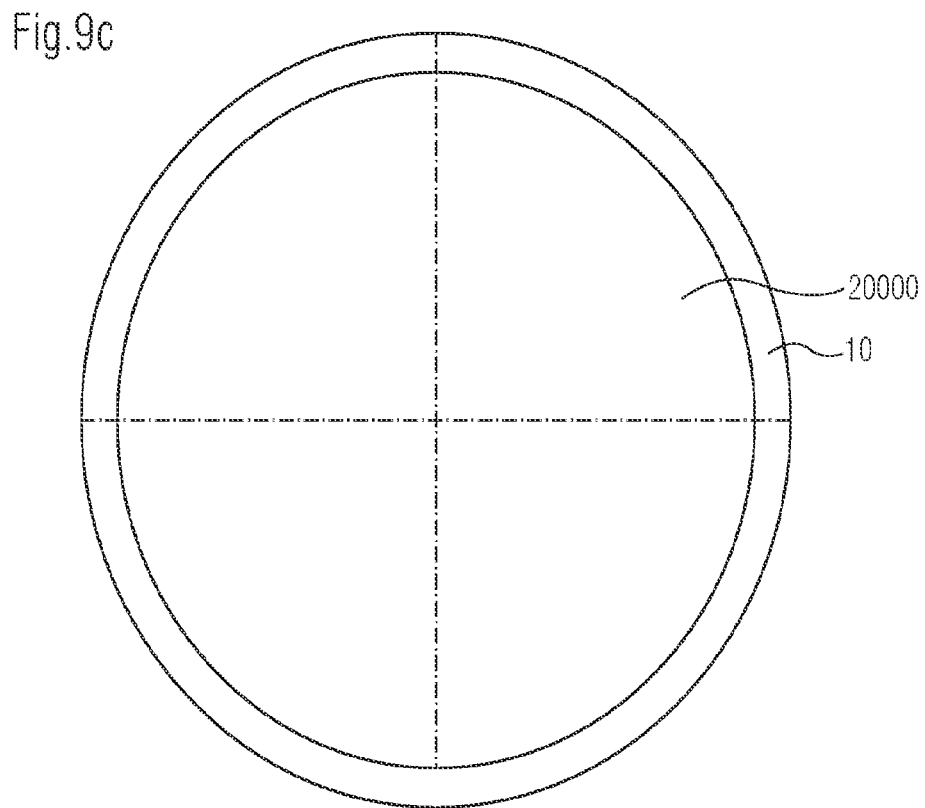
Fig.9b

ELECTRICAL DEVICE, IN PARTICULAR MICROBATTERY, AND METHOD FOR THE PRODUCTION

CROSS REFERENCE TO RELATED APPLICATIONS

This is a continuation of PCT Application No. PCT/EP2021/056011, entitled "ELECTRICAL DEVICE, IN PARTICULAR MICROBATTERY, AND METHOD FOR THE PRODUCTION", filed Mar. 10, 2021, which is incorporated herein by reference. PCT Application No. PCT/EP2021/056011 claims priority to (a) German Patent Application No. 10 2020 107 224.4, filed Mar. 17, 2020, which is incorporated herein by reference, and (b) German Patent Application No. 20 2020 106 518.1, filed Nov. 13, 2020, which is incorporated herein by reference.

BACKGROUND OF THE INVENTION

1. Field of the Invention

The present invention relates to an electrical device, in particular an electrical storage device, optionally a battery, in particular a microbattery and/or a capacitor, having a feedthrough through a housing part consisting of metal, in particular iron, iron alloys, iron-nickel alloys, iron-nickel cobalt alloys, steel, stainless steel or high-grade steel, wherein the housing part has at least one opening, wherein the opening receives a contact element consisting of a conductive material in a glass or glass ceramic material.

In addition to the electrical device, the present invention relates to a method for the production of an electrical device, which is characterized by a feedthrough with a compression seal.

2. Description of the Related Art

In the sense of the present invention, batteries are understood to be disposable batteries which are disposed of and/or recycled after their use, as well as accumulators. Accumulators, optionally lithium ion batteries, are intended for various applications, for example for portable electronic equipment, cell phones, power tools and in particular electric vehicles. The batteries can replace traditional energy sources, for example lead-acid batteries, nickel-cadmium batteries, or nickel-metal hydride batteries. Use of the battery in sensors, or in internet related devices, is also possible.

Storage devices in the sense of the current invention are also understood to be capacitors, in particular super capacitors.

Super capacitors, also referred to as super-caps, are, as generally known, electrochemical energy storage devices having an especially high output density. Super capacitors, in contrast to ceramic-, film- and electrolytic capacitors are not dielectric in the conventional sense. In particular, they actualize the storage principles of static storage of electric energy by way of charge separation in a double layer capacitance and also the electrochemical storage of electric energy by way of charge exchange with the assistance of redox reaction in a pseudo capacity.

Super capacitors include in particular hybrid capacitors, especially lithium-ion-capacitors. Their electrolyte includes normally a solvent in which conductive salts, normally lithium salts are dissolved. Super capacitors are generally used in applications where a remarkably high number of charge and discharge cycles are required. Super capacitors are used especially advantageously in the automotive sector in particular in the area of recuperation of braking energy. Other applications are obviously also possible and are covered by the current invention.

Lithium-ion batteries as storage devices have been known for many years. In this regard we refer you to the "Handbook of Batteries," published by David Linden, 2nd issue, McGrawhill, 1995, chapter 36 and 39.

Various aspects of lithium-ion batteries are described in a multitude of patents.

Some examples are: U.S. Pat. Nos. 961,672 A1, 5,952,126 A1, 5,900,183 A1, 5,874,185 A1, 5,849,434 A1, 5,853,914 A1 as well as U.S. Pat. No. 5,773,959 A1.

Lithium-ion batteries, in particular for applications in the automobile industry, generally feature a multitude of individual battery cells which are generally connected in-series. The in-series connected battery cells are usually combined into so-called battery packs and then to a battery module which is also referred to as lithium-ion battery. Each individual battery cell has electrodes which are led out of a housing of the battery cell. The same applies to the housings of super capacitors.

In particular in the use of lithium-ion batteries in the automotive environment, a multitude of problems such as corrosion resistance, stability in accidents or vibration resistance must be solved. An additional problem is the seal, in particular the hermetic seal over an extended period of time.

The seal may be compromised by example by leakage in the region of the electrodes of the battery cell or the electrode feedthrough in the battery cell and/or the housing of capacitors and/or super capacitors. Such leakages may for example be caused by temperature change stresses and alternating mechanical stresses, for example vibrations in the vehicle or aging of the synthetic material.

A short-circuit or temperature change in the battery or battery cell can lead to a reduced life span of the battery or the battery cell. Equally as important is the impermeability of the seal in accident and/or emergency situations.

In order to ensure better stability in accidents, a housing for a lithium-ion battery is suggested for example in DE 101 05 877 A1, whereby the housing includes a metal jacket which is open on both sides, and which is being sealed.

The power connection or respectively the electrode are insulated by plastic material. A disadvantage of the plastic insulations is the limited temperature resistance, the limited mechanical stability, aging and the unreliable dependability of the seal over the service life.

The power feedthroughs in the lithium-ion batteries and capacitors according to the current state of the art are therefore not integrated hermetically sealed into the cover part of the lithium-ion battery. Thus, at a pressure difference of 1 bar a maximum helium leakage rate of $1 \cdot 10^{-6}$ mbar 1 s$^{-1}$ is generally reached at the current state of the art, depending on the test specifications. Moreover, the electrodes are crimped, and laser welded connecting components with additional insulators are arranged in the interior of the battery.

An alkaline battery has become known from DE 27 33 948 A1 wherein an insulator, for example glass or ceramic is joined directly by way of a fusion seal with a metal component.

One of the metal parts is connected electrically with an anode of the alkaline battery and the other is connected electrically with a cathode of the alkaline battery. The metals used in DE 27 33, 948 A1 are iron or steel. Light metals like aluminum are not described in DE 27 33 948 A1. Also, the sealing temperature of the glass or ceramic material is not specified in DE 27 33 948 A1. The alkaline battery described in DE 27 33 948 A1 is a battery with an alkaline electrolyte which, according to DE 27 33 948 A1, contains sodium hydroxide or potassium hydroxide. Li-ion batteries are not mentioned in DE 27 33 948 A1.

A method to produce asymmetrical organic carboxylic acid esters and to produce anhydrous organic electrolytes for alkali-ion batteries has become known from DE 698 04 378 T2 or respectively EP 0885 874 B1. Electrolytes for rechargeable lithium-ion cells are also described in DE 698 04 378 T2 or respectively EP 0 885 874 B1.

Materials for the cell pedestal which receives the through-connection are not described; only materials for the connecting pin which may consist of titanium, aluminum, a nickel alloy, or stainless steel.

An RF feedthrough with improved electrical efficiency is described in DE 699 23 805 T2 or respectively EP 0 954 045 B1. The feedthroughs known from DE 699 23 805 T2 or respectively EP 0 954 045 B1 are not glass-metal feedthroughs. Glass-metal feedthroughs which are provided immediately inside for example the metal wall of a packing, are described in EP 0 954 045 B1 as being disadvantageous since RF feedthroughs of this type are not durable due to embrittlement of the glass.

DE 690 230 71 T2 or respectively EP 0 412 655 B1 describes a glass-metal feedthrough for batteries or other electro-chemical cells, whereby glasses having a $SiO_2$ content of approximately 45 weight-% are being used, and metals, in particular alloys, are being used which contain molybdenum and/or chromium and/or nickel. The use of light metals is also insufficiently addressed in DE 690 230 71 T2, as are sealing temperatures or bonding temperatures for the used glasses. According to DE 690 230 71 T2 or respectively EP 0 412 655 B1 the materials used for the pin-shaped conductor are alloys which contain molybdenum, niobium, or tantalum.

A glass-metal feedthrough for lithium-ion batteries has become known from U.S. Pat. No. 7,687,200 A1. According to U.S. Pat. No. 7,687,200 A1 the housing was produced from high-grade steel and the pin-shaped conductor from platinum/iridium. The glass materials cited in U.S. Pat. No. 7,687,200 A1 are glasses TA23 and CABAL-12. According to U.S. Pat. No. 5,015,530 A1 these are CaO—MgO—$Al_2O_3$—$B_2O_3$ systems having sealing temperatures of 1025° C. or 800° C. Moreover, glass compositions for glass-metal feedthroughs for lithium batteries have become known from U.S. Pat. No. 5,015,530 A1 which contain CaO, $Al_2O_3$, —$B_2O_3$, SrO and BaO whose sealing temperatures are in the range of 650° C.-750° C. and which are therefore too high for use with light metals.

Republished U.S. Pat. No. 10,910,609 B2 shows an electrical feedthrough for a battery housing, in particular a microbattery, wherein a borosilicate glass is used as the glass material. A CaBAl-12 glass, or a BaBAl-1 glass is mentioned as a special glass material. No statements regarding the coefficients of expansion of glass material, base body and conductor are made in U.S. Pat. No. 10,910,609 B2.

A feedthrough has become known from U.S. Pat. No. 4,841,101 A1 wherein an essentially pin-shaped conductor is sealed into a metal ring with a glass material. The metal ring is then again inserted into an opening or bore in a housing and is joined, in particular in a material to material manner, with the interior wall or respectively the bore through welding, for example after interlocking of a welding ring. The metal ring consists of a metal which has essentially the same or similar thermal coefficient of expansion as the glass material in order to compensate for the high thermal coefficient of expansion of the aluminum of the battery housing. In the design variation described in U.S. Pat. No. 4,841,101 A1 the length of the metal ring is always shorter than the bore or opening in the housing.

Feedthroughs, which are passed through a housing part of a housing for a storage device have become known from WO 2012/167921 A1, from WO 2012/110242 A1, from WO 2012/110246 A1 and WO 2012/110244 A1. In the feedthroughs a cross section is passed in a glass or glass ceramic material through the opening.

In DE 27 33 948 A1 a feedthrough is shown through a housing part of a battery, wherein the housing part has at least one opening wherein the opening includes a conductive material as well as a glass or glass ceramic material and wherein the conductive material is designed as a cap-shaped element. No indication is however given in DE 27 33 948 A1 as to which specific material the conductor consists of. Also, no indication is provided in DE 27 33 948 A1 as to the wall thickness of the cap-shaped element.

A battery with a feedthrough which has one opening has become known from U.S. Pat. No. 6,190,798 A1 wherein the conductor is a cap-shaped element and is inserted into the opening in an insulating material, which may be glass or a resin. There is also no indication in U.S. Pat. No. 6,190,798 A1 regarding the wall thickness of the cap-shaped element.

US 2015/0364 735 A1 shows a battery with a cap-shaped cover which has areas of reduced thickness as a safety outlet in the case of pressure overload.

A conical overpressure relief safeguard has become known from WO 2014/176 533 A1. An application for batteries is not described in WO 2014/176 533 A1.

DE 10 2007 063 188 A1 shows a battery with at least one single cell enclosed by a housing and a housing type overpressure relief safeguard in the form of one or several predetermined breaking points or one or several rupture disks.

U.S. Pat. No. 6,433,276 A1 shows a feedthrough wherein the metallic housing part, conductor, and glass material have the substantially same coefficient of expansion.

An explosion-proof housing for an electrical storage device has become known from CN 209691814.

DE 10 2014 016 601 A1 shows a housing component, in particular of a battery housing or capacitor housing with a feedthrough, wherein a conductor, in particular a substantially pin-shaped conductor in a glass or glass-ceramic material with an outside glass material dimension and a seal length is passed through a feedthrough opening, wherein the component—in the region of the feedthrough opening—has a reinforcement with a component feedthrough opening thickness, wherein the component feedthrough opening thickness is greater than the component thickness and the reinforcement has a reinforcement material outer dimension.

From EP 3588606 A1 a housing component including at least two bodies of light metal has become known. According to EP 3588606 A1, the first body is a light metal, and the second body is a light metal with welding promoters, in particular in the form of alloy components of the light metal. A welded joint is formed between the first and second body.

DE 10 2013 006 463 A1 shows a battery feedthrough, optionally for a lithium-ion battery, optionally for a lithium-ion accumulator, having at least one base body which has at least one opening through which the at least one conductor—in particular a pin-shaped conductor—is fed in an electrically insulating material which includes sealing glass or which consists of sealing glass, wherein the base body includes, or consists of a light metal and/or a light metal alloy, selected optionally from aluminum, magnesium, titanium, an aluminum alloy, a magnesium alloy, a titanium alloy or AlSiC. The sealing glass according to DE 10 2013 006 463 A1 is a titanate glass with a low phosphate content.

A special type of feedthrough is shown in DE 10 2017 221 426 A1. The feedthrough, which has become known from DE 10 2017 221 426 A1, includes several conductors sealed in an opening, wherein several sealed conductors are connected with each other by way of a flat conductor.

Post-published WO 2020/104571 A1 shows an electrical storage device with a feedthrough, wherein the feedthrough is embedded in a battery cover with a collar. Moreover, it has become known from post-published WO 2020/104571 A to provide a flexible flange in the region of the feedthrough.

DE 11 2012 000 900 B4 describes a glass for a feedthrough, in particular a glass solder, including the following components in mol-%:

$P_2O_5$ 37-50 mol-%, in particular 39-48 mol-%;
$Al_2O_3$ 0-14 mol-%, in particular 2-12 mol-%;
$B_2O_3$ 2-10 mol-%, in particular 4-8 mol-%;
$Na_2O$ 0-30 mol-%, in particular 0-20 mol-%;
$M_2O$ 0-20 mol-%, in particular 12-19 mol-%, wherein M=K, Cs, can be Rb;
$Li_2O$ 0-42 mol-%, in particular 0-40 mol-%, optionally 17-40 mol-%;
BaO 0-20 mol-%, in particular 0-20 mol-%, optionally 5-20 mol-%;
$Bi_2O_3$ at least 1 mol-%, in particular 1-5 mol-%, optionally 2-5 mol-%.

The glass in DE 11 2012 000 900 B4 is lead-free, except for contaminants.

It was disadvantageous on all electrical devices, in particular on storage devices according to the current state of the art that the known electrical devices, in particular the storage devices, were exceptionally large and did not include compact housings. This resulted in large dimensions, particularly large heights in storage devices. Another problem with electrical devices that had conventional feedthroughs was the use of plastic materials for electrical insulation. Thus, Nylon, polyethylene, polypropylene are described as insulating materials in DE 27 33 948 A1. Additional disadvantages were exceptionally low expulsion forces for the metal pin inserted into the insulating material.

What is needed in the art is an electrical device, in particular a storage device, wherein the disadvantages of the state of the art are avoided.

In particular, a compact and sealed storage device having small dimensions is needed in the art, which can be used as a microbattery and which has sufficient tightness. The sufficient tightness shall also be given if the material is heated by the laser welding.

A small housing thickness should optionally is also needed in the art, which, in addition to providing compactness, also leads to material savings. Moreover, a secure electrical insulation of the conductor, in particular metal pins, to be inserted into the feedthrough opening of the housing, is also needed in the art. What is needed in the art is a storage device which in itself is compact to the extent that as much volume as possible is available in the housing interior, resulting in the provision that the battery and/or capacitor can have the highest possible capacity. Thus, the storage device with feedthrough according to the present invention is suitable in particular for microbatteries. The present invention, therefore, relates in particular also to hermetically sealed microbatteries having a feedthrough, as shown in the application.

Typical applications for microbatteries are for example active RFID devices and/or medical devices, for example hearing aids, blood pressure sensors and/or wireless headphones. In this connection, the concept is often used and is thus generally known. Equally of interest are microbatteries for internet related devices.

SUMMARY OF THE INVENTION

The present invention provides, in a first aspect of the present invention, an electrical device, in particular an electrical storage device or sensor housing, a battery, in particular a micro-battery and/or a capacitor, having a feedthrough in particular through a housing part of a housing of the device made of metal, in particular iron, iron alloys, iron-nickel alloys, iron-nickel cobalt alloys, KOVAR, steel, stainless steel or high-grade steel, aluminum, an aluminum alloy, AlSiC, magnesium, a magnesium alloy, or titanium or a titanium alloy, wherein the housing part has at least one opening as part of the feedthrough, wherein the opening extends about an axis, and a first region of the housing part includes the opening housing part, and a second region of the housing part is adjacent to the opening, and the opening receives a conductive material, in particular a conductor, in a glass or glass ceramic material, characterized in that, the first region of the housing part has a width W that is substantially perpendicular to the axis of the opening, and width W of the first region is always greater than thickness $D_2$, $D_E$ of the second region, and the conductive material has a first coefficient of expansion $\alpha_1$, and the glass or glass ceramic material has a second coefficient of expansion $\alpha_2$ and the housing part has a third coefficient of expansion $\alpha_3$, wherein the third coefficient of expansion $\alpha_3$ is always greater than the second coefficient of expansion $\alpha_2$.

The present invention provides, in a further aspect of the present invention, an electrical device, in particular an electrical storage device or sensor housing, optionally a battery, in particular a micro-battery and/or a capacitor, having a feedthrough in particular through a housing part of a housing of the device made of metal, in particular iron, iron alloys, iron-nickel alloys, iron-nickel cobalt alloys, KOVAR, steel, stainless steel or high-grade steel, aluminum, an aluminum alloy, AlSiC, magnesium, a magnesium alloy, or titanium or a titanium alloy, wherein the housing part has at least one opening as part of the feedthrough, wherein the opening extends about an axis, and a first region of the housing part includes the opening, and a second region of the housing part is adjacent to the opening, and the opening receives a conductive material, in particular a conductor, in a glass or glass ceramic material, characterized in that, the conductive material has a first coefficient of expansion $\alpha_1$, and the glass or glass ceramic material has a second coefficient of expansion $\alpha_2$, and the housing part has a third coefficient of expansion $\alpha_3$, wherein the third coefficient of expansion $\alpha_3$ is always greater than the second coefficient of expansion $\alpha_2$, and in that the housing includes a flexible flange.

The present invention provides, in a third aspect of the present invention, a micro-battery, having a feedthrough in particular through a housing part (1) of a housing of the device made of metal, optionally iron, iron alloys, iron-nickel alloys, iron-nickel cobalt alloys, KOVAR, steel, stainless steel or high-grade steel, aluminum, an aluminum alloy, AlSiC, magnesium, a magnesium alloy, or titanium or a titanium alloy, wherein the housing part has at least one opening as part of the feedthrough, wherein the opening extends about an axis, and a first region of the housing part includes the opening, and a second region of the housing part is adjacent to the opening, and the opening receives a conductive material, in particular a conductor in a glass or glass ceramic material, characterized in that, the conductive material has a first coefficient of expansion $\alpha_1$, and the glass or glass ceramic material has a second coefficient of expansion $\alpha_2$, and the housing part has a third coefficient of expansion $\alpha_3$, characterized in that the third coefficient of expansion $\alpha_3$ is always greater than the second coefficient of expansion $\alpha_2$. Further, the coefficient of expansion of the housing, or respectively the base body, is greater than that of the glass material, in other words, where a compression seal is provided.

The electrical device, in particular a storage device, includes a feedthrough with an opening into which a conductor, also referred to as a contact element, is sealed.

The present invention is characterized in that the housing component includes an opening extending about an axis. The housing component has a first region in which the opening is provided and a second region adjacent the opening and the first region providing pressure on the seal. Moreover, according to the present invention, the first region has a width W substantially perpendicular to the axis of the opening. According to the invention, width W which provides the compressive force for compression sealing is always greater than the thickness or material thickness $D_2$ of the housing part in the second region adjacent to the opening or first region. The metal with width W and a third coefficient of expansion $\alpha_3$ which is always greater than the second coefficient of expansion $\alpha_2$ of the glass material applies sufficient pre-stress to the glass or glass-ceramic material for compression sealing. The conductor or metal pin has a first coefficient of expansion $\alpha_1$.

The thickness or material thickness $D_2$, $D_E$ of the housing component adjacent to the opening is optionally 0.1 mm to 1 mm, optionally 0.1 mm to 0.6 mm.

Width W of the first region that applies the necessary pre-pressure is in the range 0.6 mm to 1 mm, optionally in the range 0.7 mm to 0.9 mm. The conductive material, in particular the conductor has a first coefficient of expansion $\alpha_1$ optionally up to $11 \cdot 10^{-6}$ 1/K. The second coefficient of expansion $\alpha_2$ of the glass or glass ceramic material is optionally in the range 9 to $11 \cdot 10^{-6}$ 1/K and the coefficient of expansion $\alpha_3$ of the housing component, in particular the sheet metal part is in the range 12 to $11 \cdot 10^{-6}$ 1/K.

Due to the high coefficient of expansion $\alpha_3$ of the housing material, especially the sheet metal part, a stress is built up on the glass material by the sheet metal part and a compression seal is provided.

Compared to a matched feedthrough in which the expansion coefficients $\alpha_1$, $\alpha_2$, $\alpha_3$ are substantially the same, a compression seal has the advantage that the leaks that can occur in a matched feedthrough after the laser welding process are reliably avoided, since a pre-stress is always applied to the compression seal by the housing part surrounding the opening.

The electrical device according to the present invention, in particular the electrical storage device or sensor housing, optionally battery, in particular microbattery or capacitor with a feedthrough through a housing part in the form of sheet metal has a material strength or thickness optionally in the range of 0.1 mm to 1 mm, optionally 0.15 mm to 0.8 mm, in particular 0.15 mm to 0.6 mm. As material for the housing part and sheet metal part and/or the conductor, a metal is used, in particular iron, iron alloys, iron-nickel alloys, iron-nickel-cobalt alloys, KOVAR, steel, high grade steel, aluminum, an aluminum alloy, AlSiC, magnesium, a magnesium alloy, a copper alloy, copper or titanium or a titanium alloy. The housing part has at least one opening as part of a feedthrough, wherein the opening accommodates a conductive material, in particular a conductor consisting of a conductive material in a glass or glass ceramic material.

A duplex stainless steel or austenitic high grade steel is used as an optional material for the housing part, especially the sheet metal part.

Duplex high grade steel is a steel with a two-phase structure consisting of a ferrite ($\alpha$-iron) matrix with islands of austenite. Duplex high grade steels share the properties of chromium stainless steels (ferritic or martensitic) and stainless chromium-nickel steels (austenitic) combined. They have greater strengths than the chromium-nickel stainless steels but are more ductile than chromium stainless steels. The coefficient of expansion for duplex high grade steels is $\alpha_3 \approx 15 \cdot 10^{-6}$ 1/K, that of austenitic high grade steels is $\alpha^3 \approx 18 \cdot 10^{-6}$ 1/K.

The conductor consists optionally of a ferritic high grade steel and is designed as a ferritic high grade steel pin having a coefficient of expansion of $\alpha_1 = 10$ to $11 \cdot 10^{-6}$ 1/K. The glass material is optionally a glass material having a coefficient of expansion $\alpha_2$ in the range of 9 to $11 \cdot 10^{-6}$ 1/K.

A first embodiment of the present invention provides that the sheet metal part includes a first region with the opening and a substantially thinner second region, adjacent to the first region with the opening. Such a housing part, in particular a sheet metal part, can be manufactured by pressing down a sheet metal part having a thickness or material thickness $D_1$ of, for example from 0.6 mm to a thickness $D_2$ of, for example, 0.2 mm. Sealing occurs then in the opening with a wall thickness corresponding to the thickness $D_1$ of for example 0.6 mm. Width W of the first region with a thickness $D_1$ around the opening is sufficient to build up the necessary pre-stress of the metal on the glass material. Width W of the ring shaped region around the opening with the glass or glass-ceramic material is 0.6 mm to 1 mm.

Instead of sealing into the sheet metal part with thickness $D_1$ and excluding prohibitive pressing down, it may be provided that a thin sheet metal part with thickness $D_2$, which is, for example, about 0.2 mm, includes a collar, which is optionally a raised reshaped collar. Of course, in a further embodiment, pressing down from thickness $D_1$ to thickness $D_2$ may be omitted; in such a case, thickness $D_1$ would be substantially equal to thickness $D_2$.

In an especially advantageous embodiment, the housing part and collar are one piece, but do not have to be. In order to apply necessary pre-stressing to the glass or glass-ceramic material even with the raised collar, it is provided that the collar is not only drawn upwards and provides the seal length EL, but the collar includes an indentation and/or a protrusion or bulge. Due to the protrusion and/or indentation, the width W for sufficient pre-stressing for compression sealing is provided even with a very thin wall thickness of the raised collar which corresponds to that of the sheet metal part and which, for example, is only 0.2 mm. The stiffened shape of the collar with indentation/protrusion then applies the necessary pre-stress to the glass or glass-ceramic material. The length of the inner wall, which specifies the sealing length and is identified by EL, is in the range from 0.3 mm to 1.0 mm, in particular from 0.3 mm to 0.5 mm, and is formed by the raised edge.

With the solution according to the present invention, instead of with a solid plate, compression sealing is also possible with a very thin sheet metal part, which can be designed as a cost-effective drawn component. By selecting the coefficient of expansion $\alpha_3$ of the housing part or sheet metal part, it is possible to adjust the prestress applied to the glass, as well as the expulsion force of the sealed-in conductor.

The sealed-in conductor is optionally a ferritic stainless steel conductor.

In order to avoid a short circuit of the connection with the metal housing of the storage device, for example the battery or the capacitor, it may be provided that an insulating element is arranged on the glass or glass ceramic material which can be made in particular of a plastic material or glass or glass ceramic material and in particular covers the front face of the collar or the sheet metal part. Alternatively to the separate insulating element a glass material protruding beyond the edge, consisting for example of a foaming glass may also be provided. The plane of the surface of the collar is positioned optionally below the plane of the surface of the electrical conductor which is fed through the feedthrough. It is optional that the surface of the insulating element is on one plane with the surface of the electrical conductor which is inserted into the opening of the feedthrough.

According to the present invention, an electrical device, in particular a storage device with a feedthrough is specified which facilitates contacting of a conductor which provides as much assembly space in the interior of the housing as possible. In addition, the device according to the invention, which can be designed to be hermetically sealed and during a mechanical and/or pressure load in particular in the region between contact and sealing material, offers improved compatibility with the brittle sealing material. The enlargement of the assembly space can contribute in particular to the capacity of the storage device.

In one optional embodiment, the electrical device includes a flexible flange or connects to a flexible flange.

The flexible flange optionally includes a connecting region which serves to connect the housing part, in particular the sheet metal part with opening, with the conductor which is sealed in the glass or glass ceramic material with a housing, for example a housing of a storage device. Connecting the housing part which includes the feedthrough with the housing can be accomplished through welding, in particular laser welding, but also soldering. The connection, for example by way of welding is such that the He leakage rate is less than $1 \cdot 10^{-8}$ mbar l/s pressure differential. The He-leakage rate is thus identical to that of the sealed in conductor and thus, a hermetically sealed housing is provided for a storage device, in particular a battery.

Based on the free space at the flexible flange that is created between the raised edge which provides seal length EL and the connecting region to the adjacent housing, pressures acting upon the glass material can be reliably compensated. The flexibility of the flange prevents—for example during temperature fluctuations—breaking of the glass or compensates tensile stresses and compressive stresses which are due to welding.

In order to be able to apply sufficient prestress to the glass material even when using a flexible flange, it is advantageous to select an austenitic high grade steel or a duplex high grade steel as the material of the flexible flange. The austenitic high grade steel has a thermal expansion $\alpha$ in the range of 16 to $18 \cdot 10^{-6}$ $K^{-1}$ or 16 to $18 \cdot 10^{-6}$ 1/K, the duplex high grade steel in the range 13 to $14 \cdot 10^{-6}$ $K^{-1}$. The coefficient of expansion of the glass material is optionally in the range 9 to $10 \cdot 10^{-6}$ $K^{-1}$ range. The coefficient of expansion of ferritic steel is in the range 10 to $12 \cdot 10^{-6}$ $K^{-1}$, so that ferritic steel is optionally used for matched feedthroughs, since the coefficient of expansion of glass material and the material of the base body or of the ring surrounding the glass material can be selected to be substantially the same. Austenitic and duplex high grade steel flanges are optional for compression seals, because sufficient tensile stresses can be applied with these materials, even with small seal lengths.

Especially compact electrical storage devices are provided, if the electrical storage device has a total height of at most 40 mm, in particular at most 20 mm, optionally at most 5 mm, in particular at most 4 mm, optionally at most 3 mm, in particular in the range of 1 mm to 40 mm, optional 1 mm to 5 mm, optionally 1 mm to 3 mm, as is the case with microbatteries.

The diameter of such microbatteries is in the range of 20 mm to 3 mm, in particular in the range of 8 mm to 16 mm.

The glass or glass ceramic material may contain fillers which serve in particular to regulate thermal expansion in the glass or glass ceramic material.

The optional glass or glass-ceramic material is an alumoborate glass with main components $Al_2O_3$, $B_2O_3$, BaO and $SiO_2$. Optionally the coefficient of expansion of such a glass material is in the range 9.0 to 9.5 ppm/K or 9.0 to $9.5 \cdot 10^{-6}$ 1/K and thus in the range of the coefficient of expansion of the metal used for the housing and/or the metal pin. The specified coefficient of expansion is especially advantageous when using high grade steel, in particular ferritic or austenitic high grade steel or duplex high grade steel. The coefficient of expansion of the high grade steel in such a case is similar to that of the alumoborate glass.

Prestress for the compression seal is determined substantially by the different coefficients of expansion of the material and the housing part, in particular the sheet metal part. In order to achieve sufficient pretension, the coefficient of expansion $\alpha_3$ of the housing or sheet metal part is 2 to $6 \cdot 10^{-6}$ 1/K greater than the coefficient of expansion $\alpha_2$ of the glass material and/or the coefficient of expansion $\alpha_1$ of the conductor.

If the housing part, in particular the battery cover, includes a collar, said collar provides the required seal length EL for sealing.

In the case of a housing part with a collar, a perpendicular angulation is optional. In other words, the raised or lowered region is perpendicular to the first plane of the housing component. In this case, a particularly stable sealing of the conductor is possible since this increases the contact area between the insulator and the housing component. By raising or lowering of the housing cover with the aid of bending or forming of the thin housing material, in particular the sheet metal, the necessary length for reliable sealing is provided. Seal length EL is optionally 0.3 mm to 1.0 mm, optionally approximately 0.6 mm. By way of the glass or glass ceramic material, the conductor is inserted hermetically sealed into the feedthrough opening. Hermetically sealed is understood to have an He leakage rate of $1.10^{-8}$ mbar l/s at a pressure difference of 1 bar.

The indentations/bulging with a width W, which are necessary for applying the prestress, can also be obtained very simply by reshaping the thin housing part or sheet metal part, for example by bending.

To avoid breakage of the glass or glass ceramic material after sealing, for example due to temperature effects it is advantageous if the raised or lowered region includes a flexible flange to connect the feedthrough with a housing, for example a battery housing. The flange itself includes a region, a so-called connecting region with which the feedthrough is connected to the housing part. Connection can occur by way of welding, in particular ultrasonic welding or soldering.

The flexible flange can be obtained very easily. For example, a sheet metal part with a first thickness $D_1$, which is present around the opening can be pressed down to thickness $D_2$, after which the section having thickness $D_2$ can be reshaped so that the flexible flange is formed. It is also possible, that a sheet metal having a thickness $D_2$ is formed into a flexible flange, and the raised up sheet metal or respectively the collar accommodates the seal.

Sealing into a drawn up flexible flange, in particular the collar of the flexible flange, is possible, especially when the flexible flange and the drawn-up region as the material includes austenitic steel or Duplex steel.

In addition to the electrical device, the present invention also provides a method to produce an electrical device, in particular an electrical storage device, in particular a battery or a capacitor.

In a first design, the method for production of an electrical device with a feedthrough, wherein the housing part has at least one opening as part of a feedthrough and the opening accommodates a conductive material, in particular a conductor in a glass or glass ceramic material, includes the following steps:

In a first step a sheet metal part having a material strength or thickness $D_1$ is provided;

an opening is introduced into the sheet metal part;

outside the region around the opening, the sheet metal part is pressed down to a thickness $D_2$, in other words, the thickness of the sheet metal part is greatly reduced;

a conductor in a glass or glass ceramic material is inserted into the thick part that has not been pressed down;

subsequent to the insertion, the sheet metal part is heated with the material inserted into the opening, so that a compression seal of the conductor in the glass material or glass ceramic material is performed. The feedthrough is thus provided with a compression seal.

Thickness $D_1$ of the sheet metal part into which the sealing is performed is between 0.4 mm and 1 mm, optionally 0.6 mm. Thickness $D_2$ of the thin, pressed down region is between 0.1 mm and 0.4 mm, optionally 0.2 mm.

In a second design, a thin sheet metal part having a thickness $D_2$ is used, and a collar is drawn up around the opening by way of reshaping, in order to realize the necessary seal length which was provided in the first embodiment of the present invention by the thick sheet metal part measuring approximately 0.6 mm. According to the present invention a collar having an indentation and/or a bulge with a width W is provided. After producing the collar by way of reshaping, a conductor in a glass or glass ceramic material is inserted into the opening, and the sheet metal part with the material inserted into the opening is heated, so that a compression seal of the conductor in the glass or glass ceramic material is performed. The feedthrough is thus provided with a compression seal.

The following numbered sentences form part of the Summary of the Invention and thus represent elements of the present invention:

1. An electrical device, including:

a housing part of a housing made of a metal including a feedthrough therethrough, at least one opening as a part of the feedthrough, a first region, and a second region, the at least one opening extending about an axis, the first region including the at least one opening, the second region being adjacent to the at least one opening, the at least one opening receiving a conductive material in a glass material or a glass-ceramic material, the first region including a width W that is substantially perpendicular to the axis of the at least one opening, the width W of the first region being always greater than a thickness $D_2$, $D_E$ of the second region, and the conductive material having a first coefficient of expansion $\alpha_1$, the glass material or the glass-ceramic material having a second coefficient of expansion $\alpha_2$, the housing part having a third coefficient of expansion $\alpha_3$, and the third coefficient of expansion $\alpha_3$ being always greater than the second coefficient of expansion $\alpha_2$.

2. The electrical device according to sentence 1, wherein the thickness $D_2$, $D_E$ is in a range of 0.1 mm to 1 mm or 0.1 mm to 0.6 mm.

3. The electrical device according to sentence 1, wherein the width W is in a range of 0.6 mm to 1 mm or in a range of 0.7 mm to 0.9 mm.

4. The electrical device according to sentence 1, wherein the third coefficient of expansion $\alpha_3$ is in a range of $12 \cdot 10^{-6}$ 1/K to $19 \cdot 10^{-6}$ 1/K, and the second coefficient of expansion $\alpha_2$ is in a range of $9 \cdot 10^{-6}$ 1/K to $11 \cdot 10^{-6}$ 1/K.

5. The electrical device according to sentence 1, wherein the first coefficient of expansion $\alpha_1$ is in a range of $6 \cdot 10^{-6}$ 1/K to $11 \cdot 10^{-6}$ 1/K.

6. The electrical device according to sentence 1, wherein the conductive material is formed by a conductor, the electrical device further including a housing which includes the housing part, the housing, the housing part, and the conductor each being made of a metal, the metal of at least one of the housing, the housing part, and the conductor being iron, an iron alloy, an iron-nickel alloy, an iron-nickel-cobalt alloy, KOVAR, steel, stainless steel, high grade steel, aluminum, an aluminum alloy, AlSiC, magnesium, a magnesium alloy, copper, a copper alloy, titanium, or a titanium alloy.

7. The electrical device according to sentence 1, wherein the glass material is an aluminum-borate glass.

8. The electrical device according to sentence 7, wherein the aluminum-borate glass includes $Al_2O_3$ and $B_2O_3$.

9. The electrical device according to sentence 1, wherein the conductive material is formed by a conductor, wherein the conductor includes a head part, which is a connecting head.

10. The electrical device according to sentence 1, wherein the first region has a material thickness or a thickness $D_1$, and the second region has a material thickness or the thickness $D_2$, the thickness $D_1$ of the first region being greater than the thickness $D_2$ of the second region.

11. The electrical device according to sentence 1, wherein the first region associated with the at least one opening includes a collar, thereby forming an inside wall having a height that is greater than the material thickness or the thickness $D_2$ of the second region.

12. The electrical device according to sentence 11, wherein a seal length EL of the glass or the glass-ceramic material corresponds to the height of the collar.

13. The electrical device according to sentence 12, wherein the collar is a raised, reshaped collar, wherein the housing part and the collar are a one-piece component.

14. The electrical device according to sentence 12, wherein the collar has at least one of an indentation, a protrusion, and a bulge.

15. The electrical device according to sentence 12, wherein the material thickness or the thickness $D_2$ of the second region is substantially the same as the material thickness or the thickness of at least one of the collar, the indentation, and the protrusion.

16. The electrical device according to sentence 11, wherein an insulating element is arranged on the glass or the glass-ceramic material, which can be made in particular of a plastic material, a glass material, or a glass-ceramic material, and covers in particular the sheet metal part of the a front face of a collar or a housing part, especially the sheet metal part of the first region, wherein a surface of the collar and/or the housing part, especially the sheet metal part of the first region is positioned below a plane of a surface of the conductor or a surface of the insulating element is positioned in a plane with the surface of the conductor.

17. The electrical device according to sentence 1, wherein the electrical device has a total height of at most 40 mm, at most 20 mm, at most 5 mm, at most 4 mm, or at most 3 mm, or a total height in a range of 1 mm to 40 mm, 1 mm to 5 mm, or 1 mm to 3 mm.

18. The electrical device according to sentence 1, wherein the housing part includes a flange that is flexible.

19. The electrical device according to sentence 18, wherein the flange has (a) a free space F between a raised region or a lowered region of the housing part which provides a seal and (b) a connecting region of the flange.

20. The electrical device according to sentence 18, further including a housing which includes the housing part, wherein the flange is connected with the housing by way of welding, including laser welding, or soldering, in such a manner that a connection therebetween is substantially gas-tight and that a helium leakage rate of less than $10^{-8}$ mbar l/sec is provided.

21. The electrical device according to sentence 1, wherein the electrical device being at least one of an electrical storage device, a sensor housing, a battery, a microbattery, and a capacitor.

22. A method to produce an electrical device,
which includes a feedthrough and a housing part, the housing part including at least one opening,
the at least one opening receiving a conductive material, which forms a conductor, in a glass material or a glass-ceramic material,
whereby the method includes the steps of:
providing a sheet metal part having a material thickness or a thickness $D_1$ as housing part;
introducing the at least one opening into the sheet metal part;
pressing outside a region around the at least one opening down to a thickness $D_2$;
inserting the conductor in the glass material or the glass-ceramic material into the at least one opening; and
heating the sheet metal part with a material inserted into the at least one opening, so that a compression seal of the conductor in the glass material or the glass-ceramic material is performed.

23. The method according to sentence 22, wherein the electrical device is at least one of an electrical storage device, a sensor housing, a battery, a microbattery, and a capacitor.

24. A method to produce an electrical device, which includes a feedthrough and a housing part, the housing part including at least one opening, the at least one opening receiving a conductive material, which forms a conductor, in a glass material or a glass-ceramic material,
whereby the method includes the steps of:
providing a sheet metal part having a material thickness or a thickness $D_2$ as housing part;
introducing the at least one opening into the sheet metal part;
drawing up a collar around the at least one opening by way of reshaping or drawing up a collar around the at least one opening by way of reshaping, the collar including at least one of an indentation and a protrusion;
inserting the conductor in the glass material or the glass-ceramic material into the at least one opening with the collar;
and
heating the sheet metal part with a material inserted into the at least one opening, so that a compression seal of the conductor in the glass material or the glass-ceramic material is performed.

25. The method according to one of the sentences 22 to 24, wherein the electrical device is at least one of an electrical storage device, a sensor housing, a battery, a microbattery, and a capacitor.

26. An electrical device, including:
a housing part of a housing made of a metal including a feedthrough therethrough, at least one opening as a part of the feedthrough, a first region, and a second region, the at least one opening extending about an axis, the first region including the at least one opening, the second region being adjacent to the at least one opening, the at least one opening receiving a conductive material in a glass material or a glass-ceramic material, the conductive material having a first coefficient of expansion $\alpha_1$, the glass material or the glass-ceramic material having a second coefficient of expansion $\alpha_2$, the housing part having a third coefficient of expansion $\alpha_3$, and the third coefficient of expansion $\alpha_3$ being always greater than the second coefficient of expansion $\alpha_2$, the housing including a flange that is flexible.

27. The electrical device according to sentence 26, wherein the flange has (a) a free space F between a raised region or a lowered region of the housing part which provides a seal and (b) a connecting region of the flange, 28. The electric device according to sentence 26, wherein the electrical device is at least one of an electrical storage device, a sensor housing, a battery, a microbattery, and a capacitor 29. The electrical device according to sentence 27, further including a housing which includes the housing part, wherein the flange is connected with the housing by way of welding, including laser welding, or soldering, in such a manner that a connection therebetween is substantially gas-tight and that a helium leakage rate of less than $10^{-8}$ mbar l/sec is provided.

30. The electrical device according to sentence 26, wherein the housing part is a battery cover having a thickness $D_2$, wherein $D_2$ is in a range of 0.1 mm to 1 mm or 0.1 mm to 0.6 mm.

31. The electrical device according to sentence 30, wherein the flange is obtained by reshaping the battery cover, wherein the flange has the thickness $D_2$ of the battery cover as a thickness of the flange.

32. The electrical device according to sentence 26, wherein the flange consists of one of the following materials:
a ferritic high grade steel with a coefficient of expansion in a range 10 to 12·10-6 K−1;
a normal steel with a coefficient of expansion in a range 12 to 13·10-6 K−1;
a Duplex high grade steel with a coefficient of expansion in a range 13 to 14·10-6 K−1;
an austenitic high grade steel with a coefficient of expansion in a range 16 to 18·10-6 K−1.

33. The electrical device according to sentence 26, wherein the second coefficient of expansion $\alpha_2$ is in a range of $9 \cdot 10^{-6}$ 1/K to $11 \cdot 10^{-6}$ 1/K.

34. The electrical device according to sentence 26, wherein the first coefficient of expansion $\alpha_1$ is in a range of $6 \cdot 10^{-6}$ 1/K to $11 \cdot 10^{-6}$ 1/K.

35. The electrical device according to sentence 26, wherein the conductive material is formed by a conductor, the housing, the housing part, and the conductor each being made of a metal, the metal of at least one of the housing, the housing part, and the conductor being iron, an iron alloy, an iron-nickel alloy, an iron-nickel-cobalt alloy, KOVAR, steel, stainless steel, high grade steel, aluminum, an aluminum alloy, AISiC, magnesium, a magnesium alloy, copper, a copper alloy, titanium, or a titanium alloy.

36. The electrical device according to sentence 26, wherein the housing part in the first region associated with the at least one opening includes a collar, thereby forming an inside wall having a height that is greater than the material thickness or the thickness $D_2$ of the second region, wherein a seal length EL of the glass or the glass-ceramic material is determined by the height of the collar.

37. The electrical device according to sentence 26, wherein the electrical device has a total height of at most 40 mm, at most 20 mm, at most 5 mm, at most 4 mm, or at most 3 mm, or a total height and in a range of 1 mm to 40 mm, 1 mm to 5 mm, or 1 mm to 3 mm.

38. The electrical device according to sentence 26, wherein the conductive material is formed by a conductor, wherein the material of the flange is selected such that an expulsion force of the conductor is set by glass pre-stresses which act via the glass material also upon the conductor.

39. The electrical device according to sentence 38, wherein, by setting the expulsion force of the conductor, a safety vent function of the conductor is set.

40. The electrical device according to sentence 26, wherein the housing is configured such that a expulsion force of the conductor is adjustable through at least one of the measures described below:

a thickness of a seal;

using different ones of a plurality of glass materials;

a different bubble content in a glass;

a structured glass surface based on a shape of a glass part prior to sealing;

a structured glass surface based on a shape of a glass part during sealing;

a structured glass surface through a laser treatment after sealing;

a plurality of notches or a plurality of tapers in the glass material, on one or both sides of the housing;

a plurality of notches or a plurality of tapers in at least one of the conductor, the housing, the housing part, and a base body of the housing.

41. Electrical storage device according to sentence 26, wherein the electrical device is at least one of an electrical storage device, a sensor housing, a battery, a microbattery, and a capacitor.

42. A microbattery, including:

a housing part of a housing made of metal including a feedthrough therethrough, at least one opening as a part of the feedthrough, a first region, and a second region, the at least one opening extending about an axis, the first region including the at least one opening, the second region being adjacent to the at least one opening, the at least one opening receiving a conductive material in a glass material or a glass-ceramic material, the conductive material having a first coefficient of expansion $\alpha_1$, the glass material or the glass-ceramic material having a second coefficient of expansion $\alpha_2$, the housing part having a third coefficient of expansion $\alpha_3$, and the third coefficient of expansion $\alpha_3$ being always greater than the second coefficient of expansion $\alpha_2$.

43. The microbattery according to sentence 42, wherein the third coefficient of expansion $\alpha_3$ is in a range of $12 \cdot 10^{-6}$ 1/K to $19 \cdot 10^{-6}$ 1/K, and the second coefficient of expansion $\alpha_2$ is in a range of $9 \cdot 10^{-6}$ 1/K to $11 \cdot 10^{-6}$ 1/K.

44. The microbattery according to sentence 42, wherein the first coefficient of expansion $\alpha_1$ is in a range of 6·10-6 1/K to 11·10-6 1/K.

45. The microbattery according to sentence 42, wherein the conductive material is formed by a conductor, the microbattery further including a housing which includes the housing part, the housing, the housing part, and the conductor each being made of a metal, the metal of at least one of the housing, the housing part, and the conductor being iron, an iron alloy, an iron-nickel alloy, an iron-nickel-cobalt alloy, KOVAR, steel, stainless steel, high grade steel, aluminum, an aluminum alloy, AISiC, magnesium, a magnesium alloy, copper, a copper alloy, titanium, or a titanium alloy.

46. The microbattery according to sentence 42, wherein the microbattery has a total height of at most 40 mm, at most 20 mm, at most 5 mm, at most 4 mm, or at most 3 mm, or a total height in a range of 1 mm to 40 mm, 1 mm to 5 mm, or 1 mm to 3 mm.

47. The microbattery according to sentence 42, wherein the housing part includes a flange that is flexible.

48. The microbattery according to sentence 47, wherein the flange has (a) a free space F between a raised region or a lowered region of the housing part which provides a seal and (b) a connecting region of the flange.

49. The microbattery according to sentence 47, further including a housing which includes the housing part, wherein the flange is connected with the housing by way of welding, including laser welding, or soldering, in such a manner that a connection therebetween is substantially gas-tight and that a helium leakage rate of less than 10-8 mbar l/sec is provided.

50. The microbattery according to sentence 47, wherein the housing part includes a battery cover having a thickness $D_2$, wherein $D_2$ is in a range of 0.1 mm to 1 mm or 0.1 mm to 0.6 mm.

51. The microbattery according to sentence 47, wherein the flange is obtained by reshaping the battery cover, wherein the flange has the thickness $D_2$ of the battery cover as a thickness of the flange.

52. The microbattery according to sentence 47, wherein the flange consists of one of the following materials:

a ferritic high grade steel with a coefficient of expansion in a range 10 to 12·10-6 K–1;

a normal steel with a coefficient of expansion in a range 12 to 13·10-6 K–1;

a Duplex high grade steel with a coefficient of expansion in a range 13 to 14·10-6K–1;

an austenitic high grade steel with a coefficient of expansion in a range 16 to 18·10-6 K–1.

53. The microbattery according to sentence 47, wherein the conductive material is formed by a conductor, wherein a material of the flange is selected such that an expulsion force of the conductor is set by glass pre-stresses which act via the glass material also upon the conductor.

54. The microbattery according to sentence 53, wherein, by setting the expulsion force of the conductor, a safety vent function of the conductor is set, such that the microbattery is configured for opening in an event of an overpressure in a case of a damage.

55. The microbattery according to sentence 42, further including a housing which includes the housing part, wherein the housing is configured such that the expulsion force of the conductor is adjustable through at least one of the measures described below:

a thickness of a seal;

using different ones of a plurality of glass materials;

a different bubble content in a glass;

a structured glass surface based on a shape of a glass part prior to sealing;

a structured glass surface based on a shape of a glass part during sealing;

a structured glass surface through a laser treatment after sealing;

a plurality of notches or a plurality of tapers in the glass material, on one or both sides of the housing;

a plurality of notches or a plurality of tapers in at least one of the conductor, the housing, the housing part, and a base body of the housing;

a length of a seal and a formation of menisci.

56. The microbattery according to sentence 42, wherein the glass material is an aluminum-borate glass.

57. The microbattery according to sentence 42, wherein the aluminum-borate glass includes $Al_2O_3$ and $B_2O_3$.

58. The microbattery according to sentence 42, wherein the conductive material is formed by a conductor, the conductor including a head part, which is a connecting head.

59. The microbattery according to sentence 42, wherein the glass material or the glass-ceramic material introduced between the conductive material and the housing part forms a meniscus to the housing part.

60. An electrical device, in particular an electrical storage device or sensor housing, optionally a battery, in particular a micro-battery and/or a capacitor, having a feedthrough in particular through a housing part (1) of a housing of the device made of metal, in particular iron, iron alloys, iron-nickel alloys, iron-nickel cobalt alloys, KOVAR, steel, stainless steel or high-grade steel, aluminum, an aluminum alloy, AISiC, magnesium, a magnesium alloy, or titanium or a titanium alloy, wherein housing part (1) has at least one opening (3) as part of the feedthrough, wherein opening (3) extends about an axis and a first region of the housing part includes the opening housing part and a second region of the housing part is adjacent to the opening and the opening receives a conductive material, in particular a conductor (20) in a glass or glass ceramic material (22), characterized in that, the first region of the housing part has a width W that is substantially perpendicular to the axis of the opening and width W of the first region is always greater than thickness D2, DE of the second region and the conductive material has a first coefficient of expansion α1, and the glass or glass ceramic material (22) has a second coefficient of expansion α2 and the housing part has a third coefficient of expansion α3, wherein the third coefficient of expansion α3 is always greater than the second coefficient of expansion α2.

61. The electrical device according to sentence 60, characterized in that, thickness D2, DE is in the range of 0.1 mm, optionally 0.1 mm to 0.6 mm.

62. The electrical device according to one of the sentences 60 to 61, characterized in that, width W is in the range of 0.6 mm, optionally in the range of 0.7 mm to 0.9 mm.

63. The electrical device according to one of the sentences 61 to 62, characterized in that, the third coefficient of expansion $\alpha_3$ is in the range of 12·10-6 1/K to 19·10-6 1/K and second coefficient of expansion $\alpha_2$ is in the range of 9·10-6 1/K to 11·10-6 1/K.

64. The electrical device according to one of the sentences 60 to 63, characterized in that, the first coefficient of expansion $\alpha_1$ is in the range of 6·10-6 1/K to 11·10-6 1/K.

65. The electrical device according to one of the sentences 60 to 64, characterized in that, the metal of the housing and/or the conductor is iron, iron alloys, iron-nickel alloys, iron-nickel-cobalt alloys, KOVAR, steel, stainless steel, high grade steel, aluminum, an aluminum alloy, AISiC, magnesium, a magnesium alloy, copper, a copper alloy, or titanium or a titanium alloy.

66. The electrical device according to one of the sentences 60 to 65, characterized in that, the glass material is an aluminum-borate glass.

67. The electrical device according to sentence 66, characterized in that, the aluminum-borate glass includes $Al_2O_3$ and $B_2O_3$.

68. The electrical device according to one of the sentences 60 to 67, characterized in that, the conductor includes a head part, optionally connecting head, (20000).

69. The electrical device according to one of the sentences 60 to 68, characterized in that, the first region has a material strength or thickness $D_1$ and second region (5) has a material strength or thickness $D_2$, and in that thickness $D_1$ of the first region is greater than thickness $D_2$ of second region (5).

70. The electrical device according to one of the sentences 60 to 69, characterized in that, the first region in the region of opening (3) includes a collar (40), thereby forming an inside wall having a height that is greater than material strength or thickness $D_2$ of second region (5), wherein optionally seal length EL of glass or glass ceramic material (2, 1020) corresponds to the height of collar (40).

71. The electrical device according to sentence 70, characterized in that, collar (40) is a raised, reshaped collar, wherein housing part and collar are in particular a one-piece component.

72. The electrical device according to one of the sentences 70 to 71, characterized in that, collar (40) has an indentation (42) and/or a protrusion or bulge (44), optionally with a width W.

73. The electrical device according to one of the sentences 70 to 72, characterized in that, the material strength or thickness $D_2$ of second region (5) is substantially the same as the material strength or thickness of the collar and/or of the indentation and/or protrusion.

74. The electrical device according to at least one of the preceding sentences 60 to 73, characterized in that, an insulating element (10030, 20010) is arranged on the glass or glass ceramic material which can be made in particular of a plastic material or glass or glass ceramic material and in particular covers the front face of collar (40) or of the housing part, in particular the sheet metal part of the first region, wherein optionally the surface of collar (40) and/or of the housing part, in particular of the sheet metal part of the first region is positioned optionally below the plane of the surface of conductor (20), or the surface of the insulating element is positioned on a plane with the surface of conductor (20).

75. The electrical device according to at least one of the preceding sentences 60 to 74, characterized in that, the electrical device has a total height of at most 40 mm, in particular at most 20 mm, optionally at most 5 mm, in particular at most 4 mm, optionally at most 3 mm, in particular in the range of 1 mm to 40 mm, optionally 1 mm to 5 mm, optionally 1 mm to 3 mm.

76. The electrical device according to at least one of the preceding sentences 60 to 75, characterized in that, the housing part includes a flexible flange (310).

77. The electrical device according to at least one of the preceding sentences 60 to 76, characterized in that, flange (310) has a free space F between a raised or lower region which provides the seal and a connecting region.

78. The electrical device according to at least one of the preceding sentences 60 to 77, characterized in that, flange (310), in particular the flexible flange is connected with the battery housing by way of welding, in particular laser welding or soldering, in particular in such a manner that the connection is substantially gas-tight and that a leakage rate He of less than $10^{-8}$ mbar l/sec is provided.

79. A method to produce an electrical device, in particular an electrical storage device or sensor housing, optionally a battery, in particular a micro-battery and/or a capacitor, having a feedthrough, wherein housing part (1) has at least one opening (3), and opening (3) receives a conductive material, in particular a conductor (20) in a glass or glass ceramic material (22), including the following steps:

a sheet metal part having a material strength or thickness $D_1$ is provided as a housing part an opening (3) is introduced into the sheet metal part outside the region around opening (3), the sheet metal part is pressed down to a thickness $D_2$, a conductor in a glass or glass ceramic material (22) is inserted into the opening the sheet metal part is heated with the material inserted into the opening, so that a compression seal of the conductor in the glass material or glass ceramic material is performed.

80. A method to produce an electrical device, in particular an electrical storage device or sensor housing, optionally a battery, in particular a micro-battery and/or a capacitor, having a feedthrough, wherein housing part (1) has at least one opening (3), and opening (3) receives a conductive material, in particular a conductor (20) in a glass or glass ceramic material (22), including the following steps:

a sheet metal part having a material strength or thickness $D_2$ is provided as a housing part an opening is introduced into the sheet metal part around the opening a collar is drawn up by way of reshaping, in particular a collar with an indentation and/or a protrusion a conductor in a glass or glass ceramic material is inserted into the opening with collar the sheet metal part is heated with the material inserted into the opening, so that a compression seal of the conductor in the glass material or glass ceramic material is performed.

81. An electrical device, in particular an electrical storage device or sensor housing, optionally a battery, in particular a micro-battery and/or a capacitor, having a feedthrough in particular through a housing part (1) of a housing of the device made of metal, in particular iron, iron alloys, iron-nickel alloys, iron-nickel cobalt alloys, KOVAR, steel, stainless steel or high-grade steel, aluminum, an aluminum alloy, AlSiC, magnesium, a magnesium alloy, or titanium or a titanium alloy, wherein housing part (1) has at least one opening as part of the feedthrough, wherein opening (3) extends about an axis and a first region of the housing part includes the opening and a second region of the housing part is adjacent to the opening and the opening receives a conductive material, in particular a conductor (20) in a glass or glass ceramic material (22), characterized in that, the conductive material has a first coefficient of expansion $\alpha_1$, and the glass or glass ceramic material (22) has a second coefficient of expansion $\alpha_2$ and the housing part has a third coefficient of expansion $\alpha_3$, wherein the third coefficient of expansion $\alpha_3$ is always greater than the second coefficient of expansion $\alpha_2$ and in that the housing includes a flexible flange.

82. The electrical device according to sentence 81, characterized in that, flange (310) has a free space F between a raised or lower region which provides the seal and a connecting region.

83. The electrical device according to sentence 82, characterized in that, flange (310), in particular the flexible flange is connected with the battery housing by way of welding, in particular laser welding or soldering, in particular in such a manner that the connection is substantially gas-tight and that a leakage rate He of less than $10^{-8}$ mbar l/sec is provided.

84. The electrical device according to one of the sentences 81 to 83, characterized in that, the housing part is a battery cover having a thickness $D_2$, wherein $D_2$ is in the range of 0.1 mm to 1 mm, optionally 0.1 mm to 0.6 mm.

85. The electrical device according to one of the sentences 81 to 83, characterized in that, the flexible flange is obtained by reshaping the battery cover part, wherein the flexible flange has thickness $D_2$ of the battery cover part as its thickness.

86. The electrical device according to one of the sentences 81 to 85, characterized in that, the flexible flange consists of one of the following materials:

a ferritic high grade steel with a coefficient of expansion in the range 10 to $12 \cdot 10^{-6}$ $K^{-1}$ a normal steel with a coefficient of expansion in the range 12 to $13 \cdot 10^{-6}$ $K^{-1}$ a Duplex high grade steel with a coefficient of expansion in the range 13 to $14 \cdot 10^{-6}$ $K^{-1}$ an austenitic high grade steel with a coefficient of expansion in the range 16 to $18 \cdot 10^{-6}$ $K^{-1}$.

87. The electrical device according to one of the sentences 81 to 86, characterized in that, the second coefficient of expansion $\alpha_2$ is in the range of $9 \cdot 10^{-6}$ 1/K to $11 \cdot 10^{-6}$ 1/K.

88. The electrical device according to one of the sentences 81 to 87, characterized in that, the first coefficient of expansion $\alpha_1$ is in the range of $6 \cdot 10^{-6}$ 1/K to $11 \cdot 10^{-6}$ 1/K.

89. The electrical device according to one of the sentences 81 to 88, characterized in that, the metal of the housing and/or the conductor is iron, iron alloys, iron-nickel alloys, iron-nickel-cobalt alloys, KOVAR, steel, stainless steel, high grade steel, aluminum, an aluminum alloy, AlSiC, magnesium, a magnesium alloy, copper, a copper alloy, or titanium or a titanium alloy.

90. The electrical device according to one of the sentences 81 to 89, characterized in that, the housing part in the region of the opening includes a collar (40), thereby forming an inside wall having a height that is greater than material strength or thickness $D_2$ of second region (5), wherein seal length EL of the glass or glass ceramic material is determined by the height of collar (40).

91. The electrical device according to one of the preceding sentences 81 to 90, characterized in that, the electrical device has a total height of at most 40 mm, in particular at most 20 mm, optionally at most 5 mm, in particular at most 4 mm, optionally at most 3 mm, in particular in the range of 1 mm to 40 mm, optionally 1 mm to 5 mm, optionally 1 mm to 3 mm.

92. The electrical device according to one of the sentences 81 to 91, characterized in that, the materials of the flexible flange are selected such, that the glass pre-stresses which act via the glass also upon the conductor, and thereby also the expulsion force of the conductor is being set.

93. The electrical device according to one of the sentences 81 to 92, characterized in that, by setting the expulsion force of the conductor, a safety vent function of the conductor is set, in other words, opening of a storage device, in particular the battery in the event of overpressure in the case of damage.

94. The electrical device according to one of the sentences 81 to 93, characterized in that, the expulsion force of the conductor can be adjusted through one or several of the measures described below:

thickness of seal use of different glass materials different bubble content in glass a structured glass surface based on the shape of the glass part prior to sealing a structured glass surface based on the shape of the glass part during sealing a structured glass surface through laser treatment after sealing notches or tapers in glass material, on one or both sides notches or tapers in the conductor and/or housing or housing part or base body 95. A micro-battery, having a feedthrough in particular through a housing part (1) of a housing of the device made of metal, optionally iron, iron alloys, iron-nickel alloys, iron-nickel cobalt alloys, KOVAR, steel, stainless steel or high-grade steel, aluminum, an aluminum alloy, AlSiC, magnesium, a magnesium alloy, or titanium or a titanium alloy, wherein housing part (1) has at least one opening as part of the feedthrough, wherein opening (3) extends about an axis and a first region of the housing part includes the opening and a second region of the housing part is adjacent to the opening and the opening receives a conductive material, in particular a conductor (20) in a glass or glass ceramic material (22), characterized in that, the conductive material has a first coefficient of expansion $\alpha_1$, and the glass or glass ceramic material (22) has a second coefficient of expansion $\alpha_2$ and the housing part has a third coefficient of expansion $\alpha_3$, characterized in that the third coefficient of expansion $\alpha_3$ is always greater than the second coefficient of expansion $\alpha_2$.

96. The micro-battery according to sentence 95, characterized in that, the third coefficient of expansion $\alpha_3$ is in the range of $12\cdot10^{-6}$ 1/K to $19\cdot10^{-6}$ 1/K and second coefficient of expansion $\alpha_2$ is in the range of $9\cdot10^{-6}$ 1/K to $11\cdot10^{-6}$ 1/K.

97. The micro-battery according to one of the sentences 95 to 96, characterized in that, the first coefficient of expansion $\alpha_1$ is in the range of $6\cdot10^{-6}$ 1/K to $11\cdot10^{-6}$ 1/K.

98. The micro-battery according to one of the sentences 95 to 97, characterized in that, the metal of the housing and/or the conductor is iron, iron alloys, iron-nickel alloys, iron-nickel-cobalt alloys, KOVAR, steel, stainless steel, high grade steel, aluminum, an aluminum alloy, AlSiC, magnesium, a magnesium alloy, copper, a copper alloy, or titanium or a titanium alloy.

99. The micro-battery according to one of the preceding sentences 95 to 98, characterized in that, the electrical device has a total height of at most 40 mm, in particular at most 20 mm, optionally at most 5 mm, in particular at most 4 mm, optionally at most 3 mm, in particular in the range of 1 mm to 40 mm, optionally 1 mm to 5 mm, optionally 1 mm to 3 mm.

100. The micro-battery according to one of the preceding sentences 95 to 99, characterized in that, the housing part includes a flexible flange.

101. The micro-battery according to one of the preceding sentences 95 to 100, characterized in that, the flange has a free space F between a raised or lower region which provides the seal and a connecting region.

102. The micro-battery according to one of the preceding sentences 95 to 101, characterized in that, flange (310), in particular the flexible flange is connected with the battery housing by way of welding, in particular laser welding or soldering, in particular in such a manner that the connection substantially gas-tight and that a leakage rate He of less than $10^{-8}$ mbar l/sec is provided.

103. The micro-battery according to one of the sentences 95 to 102, characterized in that, the micro-battery as a housing part includes a battery cover having a thickness $D_2$, wherein $D_2$ is in the range of 0.1 mm to 1 mm, optionally 0.1 mm to 0.6 mm.

104. The micro-battery according to one of the sentences 95 to 103, characterized in that, the flexible flange is obtained by reshaping the battery cover part, wherein the flexible flange has thickness $D_2$ of the battery cover part as its thickness.

105. The micro-battery according to one of the sentences 95 to 104, characterized in that, the flexible flange consists of one of the following materials:

a ferritic high grade steel with a coefficient of expansion in the range 10 to $12\cdot10^{-6}$ $K^{-1}$ a normal steel with a coefficient of expansion in the range 12 to $13\cdot10^{-6}$ $K^{-1}$ a Duplex high grade steel with a coefficient of expansion in the range 13 to $14\cdot10^{-6}$ $K^{-1}$ an austenitic high grade steel with a coefficient of expansion in the range 16 to $18\cdot10^{-6}$ $K^{-1}$.

106. The micro-battery according to one of the sentences 95 to 105, characterized in that, the materials of the flexible flange are selected such, that the glass pre-stresses which act via the glass also upon the conductor, and/or the expulsion force of the conductor is set.

107. The micro-battery according to one of the sentences 95 to 106, characterized in that, by setting the expulsion force of the conductor, a safety vent function of the conductor is set, in other words, opening of the storage device, in particular the battery in the event of overpressure in the case of damage.

108. The micro-battery according to one of the sentences 95 to 107, characterized in that, the expulsion force of the conductor can be adjusted through one or several of the measures described below:

thickness of seal use of different glass materials different bubble content in glass a structured glass surface based on the shape of the glass part prior to sealing a structured glass surface based on the shape of the glass part during sealing a structured glass surface through laser treatment after sealing notches or tapers in the glass material, on one or both sides notches or tapers in conductor and/or housing or housing part or base body Length of seal and formation of menisci 109. The micro-battery according to one of the sentences 95 to 108, characterized in that, the glass material is an aluminum-borate glass.

110. The micro-battery according to sentence 109, characterized in that, the aluminum-borate glass includes $Al_2O_3$ and $B_2O_3$.

111. The micro-battery according to one of the sentences 95 to 110, characterized in that, the conductor includes a head part, optionally connecting head.

112. The micro-battery according to one of the sentences 95 to 111, characterized in that, the glass or glass ceramic material introduced between the conductive material, in particular the conductor and the housing part, in particular the base body, forms a meniscus to the housing part, in particular the base body.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIGS. 9a, 9b and 9c is each a feedthrough with conductor, including connecting head;

Corresponding reference characters indicate corresponding parts throughout the several views. The exemplification set out herein illustrate embodiments of the invention, and such exemplifications are not to be construed as limiting the scope of the invention in any manner.

DETAILED DESCRIPTION OF THE INVENTION

Figure 1A:
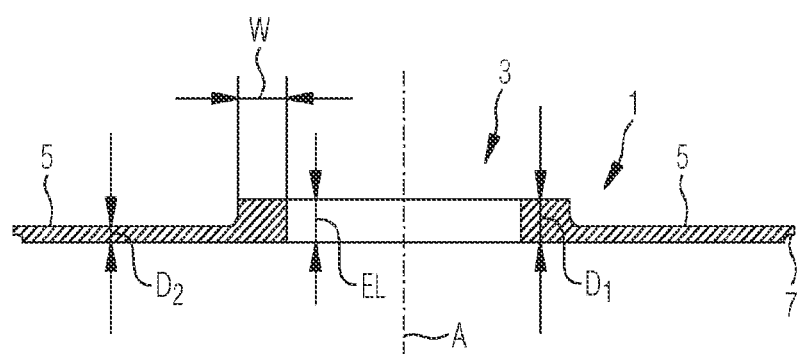
FIG. 1a is a cross section through a housing, in particular a battery cover with an opening for sealing into it a conductor, wherein the sheet metal part is pressed down adjacent to the opening to a low material thickness, according to a first embodiment.
Figure 1B:
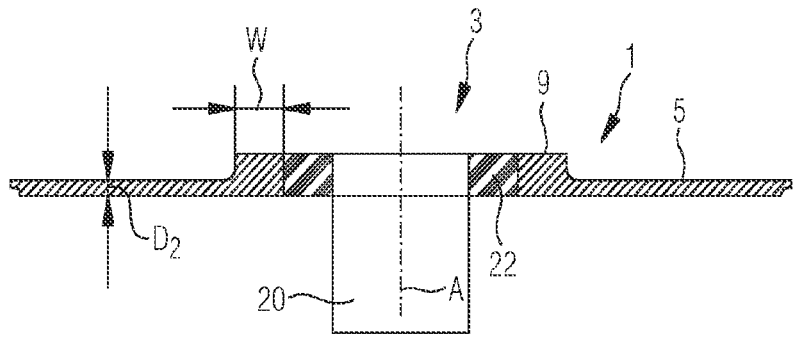
FIG. 1b a cross section through a housing part according to FIG. 1a with a conductor sealed into the opening.
Figure 8:
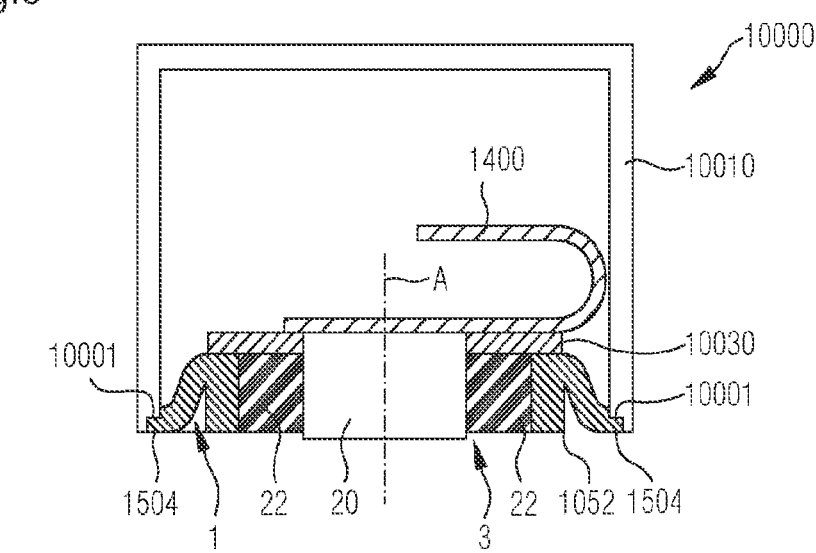
FIG. 8 microbattery with an inventive housing part or battery cover according to FIGS. 3, 4, 5, 6, 7.

In FIG. 1 an inventive housing part or sheet metal part 1 is shown as a part of a housing, in particular a housing of a storage device, for example a battery, in particular a micro-battery, as illustrated in FIG. 8. The sheet metal part includes an opening 3 into which a conductor can be sealed. The sealed in conductor is not shown in FIG. 1a. The sheet metal part with inserted conductor is shown in FIG. 1b. The thin section 5 of the sheet metal part with an opening 3 as part of the housing of a storage device is produced by pressing down the sheet metal part. This means that initially a sheet metal with sufficient wall thickness of approximately 0.6 mm is provided for sealing of a conductor into a glass or glass ceramic material. Then, an opening is introduced by way of a stamping process into the sheet metal part with sufficient wall thickness. After introducing opening 3—for example by way of a stamping process—into sheet metal part 1, the sheet metal part with a thickness or material strength $D_1$ is reduced in its thickness in regions 5, for example by way of pressing down. The thickness or the sheet metal part into which sealing occurs is, for example, 0.6 mm, and the thickness of the pressed-down part of the sheet metal part is, for example, only 0.2 mm.

In FIG. 1a the thickness of the sheet metal in the region of the opening into which the sealing is performed, is identified as $D_1$. Thickness D1 corresponds with the length which is required for a compression seal of a conductor in a glass or glass ceramic material, as shown in FIG. 1b. Because of the material thickness or thickness $D_1$, a pre-stress is applied to the glass or glass-ceramic material and the conductor encased in the glass or glass ceramic material due to the different coefficients of expansion of the sheet metal part or housing part and the glass or glass-ceramic material or the conductor, so that compression sealing of the conductor is provided. To provide the prestress, the region of thickness $D_1$ includes substantially perpendicular to the axis A of opening 3 a width W. Width W ensures that the metal surrounding the opening or the metal ring surrounding the opening can provide the necessary prestress for the compression seal. The pressure seal is characterized in that the helium leakage rate is less than $1 \cdot 10^{-8}$ mbar/sec at 1 bar pressure differential. According to the present invention, the coefficient of expansion $\alpha_1$ of the conductor and the coefficient of expansion $\alpha_2$ of the glass material differ from the coefficient of expansion $\alpha_3$ of the sheet metal part or housing material. To apply the necessary prestress, the coefficient of expansion $\alpha_3$ of the sheet metal part or housing part is approximately 2 to $8 \cdot 10^6$ 1/K greater than the coefficient of expansion of the conductor or glass ceramic material. For example, the coefficient of expansion $\alpha_3$ of the housing part, in particular the sheet metal part, is in the range 12 to $19 \cdot 10^{-6}$ 1/K, and that of the conductive material or glass or glass ceramic is in the range 9 to $11 \cdot 10^{-6}$ 1/K.

The housing part consists optionally of a Duplex high grade steel with a coefficient of expansion of approximately $15 \cdot 10^{-6}$ 1/K or of an austenitic material with a coefficient of expansion of approximately $18 \cdot 10^{-6}$ 1/K. With the illustrated embodiment of a housing or sheet metal part, a compression seal is provided even with a very thin sheet metal wall thickness and a seal length of only 0.6 mm. Despite the thin sheet thickness of only 0.6 mm, the ring with thickness $D_1$ surrounding the opening provides sufficient prestress for the compression seal.

The connection to the remaining housing part of a battery housing is made in the region of the thin sheet metal part with thickness $D_2$ by a protrusion 7 inserted into the thin sheet metal part, for example by way of a welded joint.

FIG. 1b shows a housing part according to FIG. 1a with a sealing glass ring 9 having a thickness $D_1$ and conductor 20 sealed in sealing glass ring 9. The glass material which accommodates conductor 20 is marked with reference number 22. The thickness of pressed sheet metal part 5 outside the sealing glass ring is $D_2$. The glass ring has a width W, which is used to apply the necessary compression pressure for the compression seal.

An additional embodiment may provide that thickness $D_2$ corresponds with thickness $D_1$.

Figure 2A:
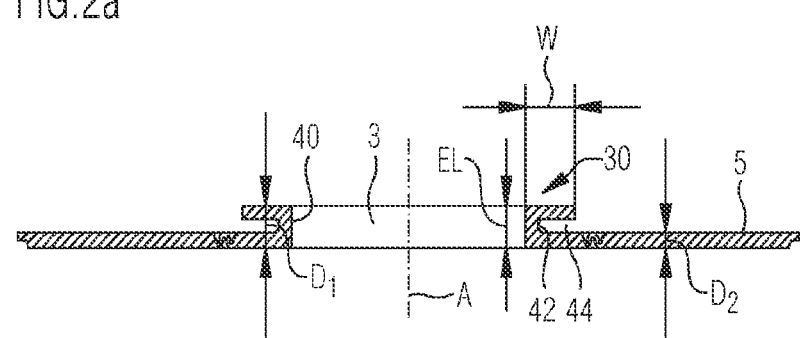
FIG. 2a a cross section through a housing part, in particular a battery cover with an opening for sealing into it a conductor, wherein the sheet metal part includes a collar that provides a wall for sealing a conductor into the opening with collar.
Figure 2B:
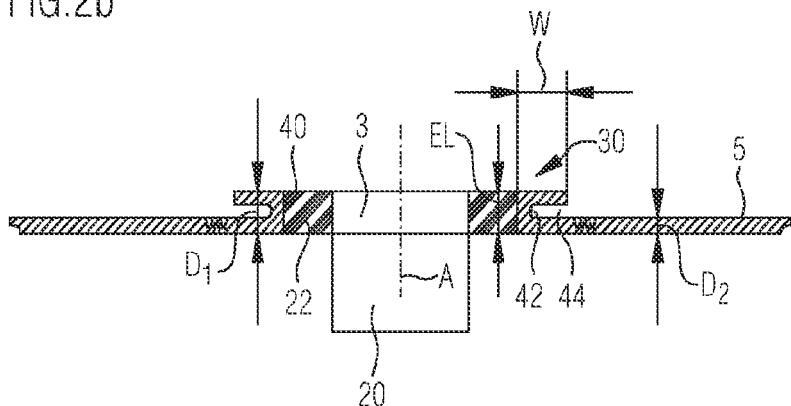
FIG. 2b a cross section through a housing part according to FIG. 2a with a conductor sealed into the opening.

Instead of the sealing ring as shown in FIGS. 1a and 1b, an alternative embodiment can provide that the sheet metal used generally has a thickness $D_2$, and an edge 30 required for sealing in the region of opening 3 is not provided by a solid sheet metal part, but by drawing up or deep-drawing an edge 40 of thin sheet metal part 5, as shown in FIGS. 2a and 2b. Drawn up edge 40 is then present in the shape of a collar. As shown in FIG. 2b, conductor 20 is sealed in a glass material 22 into drawn-up collar 40. Collar 40 includes an indentation 42 and a bulge 44. The indentation provides a certain flexibility to avoid glass breakages. The bulge has a width W, essentially toward axis A, which ensures that sufficient prestress is applied by the housing part. In the described design example, width W is approximately 0.6 mm. The conductor sealed into the opening in the region of the collar is subjected to sufficient prestress for a compression seal.

The advantage of the method according to FIGS. 2a and 2b compared to the method according to FIGS. 1a and 1b is, that pressing down of the sheet metal is not necessary. The metal with consistent metal thickness $D_2$ needs only to be reshaped, so that collar 40 is formed having a height consistent with seal length EL and having indentations 42 and bulges 44. Seal length EL is at least 0.6 mm and thus corresponds to thickness $D_1$ of the embodiments according to FIGS. 1a and 1b. Thickness $D_2$ of the sheet metal part, from which the collar is obtained by drawing up, is approximately $D_2$=0.2 mm.

Due to the different coefficient of thermal expansion $\alpha_3$ of the sheet metal part, which is significantly higher than that of the conductor or the glass or glass material, raised collar 40 with bulges 44 as shown in FIGS. 2a and 2b provides sufficient prestress onto conductor 20 for a compression seal. The conductor, sealed into opening 3, as indicated in FIG. 2b, can consist of a ferritic high grade steel with an $\alpha_1$ of 10 to $11\cdot10^{-6}$ 1/K, and the material of the sheet metal part or housing part and collar is a Duplex high grade steel or an austenitic high grade steel with a coefficient of expansion $\alpha_3$ in the range of 15 to $18\cdot10^{-6}$ 1/K.

Compared to massive plates, the version according to the present invention is characterized by a very thin wall thickness $D_2$, according to FIGS. 2a and 2b. The expulsion force of conductor 20 is determined by the prestress due to bulge 44 with width W which is applied by the sheet metal part or housing part onto the glass.

Figure 3:
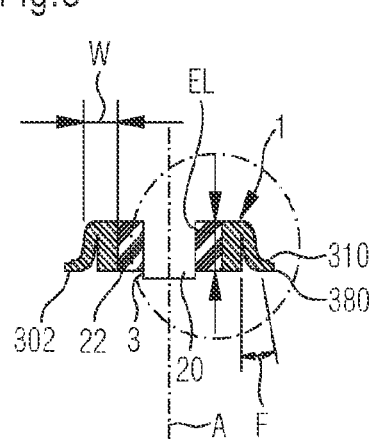
FIG. 3 a cross section through a housing part, in particular a battery cover, with an opening for sealing in a conductor, wherein the housing cover includes a flexible flange.
Figure 5:
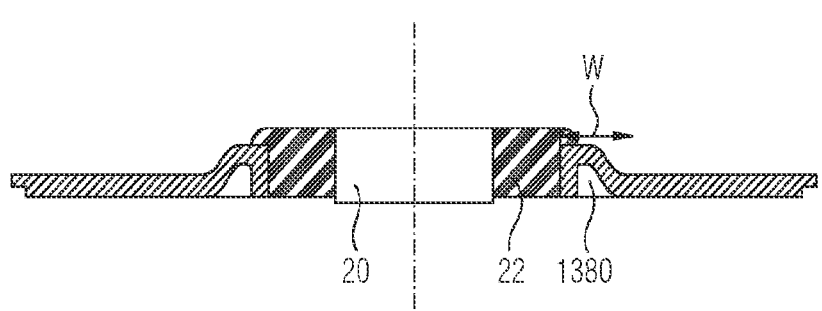
FIG. 5 housing part with flexible flange, wherein the flexible flange is obtained by reshaping a sheet metal part having a thickness $D_2$.

FIG. 3 shows a design wherein housing part 1 includes a flexible flange 310 for an electrical storage device. Flange 310 includes a connecting region 380 which serves to connect the feedthrough or housing part or respectively battery part 1 with opening 3 with the conductor sealed in the glass or glass ceramic material, with a housing, for example a housing of a storage device, as shown in FIG. 5. Connecting of the sheet metal part with opening with the housing can occur by way of welding, in particular laser welding or also soldering. The connection is such, that the He leakage rate is less than $1\cdot10^{-6}$ mbar l/s at 1 bar pressure difference. The He leakage rate is herewith the same as that for the sealed conductor, and a hermetically sealed housing for a storage device, in particular a battery is thus provided. Due to free space F, which is formed between the raised area, that is edge 300, which is to be equated with the raised collar according to the embodiment according to FIGS. 2a to 2b, which provides seal length EL and connecting region 380, pressures acting on the glass material can be reliably compensated. The flexibility of flange 310 prevents—for example on temperature fluctuations—braking of the glass. In particular, the flexibility of flange 310 avoids any tensile and compressive stresses that might be caused, for example by laser welding. Tensile and compressive stresses can thus be absorbed. In the current example, seal length EL is provided by a sheet metal part having a thickness $D_2$ of, for example 0.2 mm and a width W, which is pressed down and subsequently reshaped into a flexible flange, as illustrated in FIGS. 1a and 1b. Sealing takes place into opening 3 of the housing part. The region of the housing part which applies the prestress to the glass material is identified with 300. Width W of the flexible flange provides the prestress which is applied onto the glass material. As shown in FIG. 3, width W of the flexible flange extends beyond the wall thickness of the sheet metal section in which sealing takes place and into the region of the flexible flange.

The housing part, optionally the sheet metal part is in particular a part of a housing of an electrical storage device, in particular a battery cover. Laser welding of the illustrated housing part 1 to the rest of the housing occurs at tip 302 of flexible flange 380. In the region of tip 302, the thickness of the flange is weakened and is only 0.15 mm instead of, for example, 0.2 mm for the sheet metal part. Flange 380 of the housing part with opening or respectively feedthrough, which is weakened in the region of tip 302, can be connected directly with a remaining housing of the electrical storage device, resulting in the electrical storage device. Due to laser welding, the entire component, including the glass or glass ceramic material, is heated. In feedthroughs without compression seals, the feedthrough, in other words the glass and/or glass ceramic material, could come loose, and the feedthrough would leak. This is avoided in a compression seal. The housing of the storage device includes a housing part with opening or respectively a feedthrough according to the present invention. Since the feedthrough or respectively the housing part with the opening is very compact due to the very thin material thickness $D_2$ of only 0.1 mm to 1 mm of the housing part or respectively the battery cover, a very compact storage device, in particular a microbattery can be provided when such a sheet metal part is installed as part of a feedthrough in a battery housing, for example by welding in the area of the tip 302 of the flexible flange to the rest of the housing of the storage device.

Figure 4:
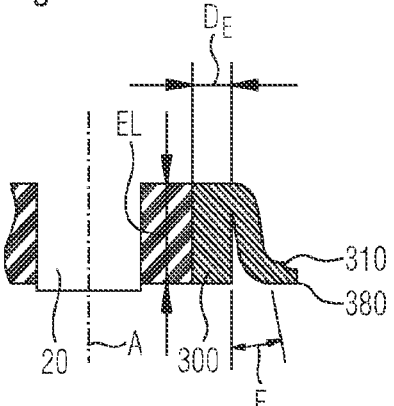
FIG. 4 detail of the housing part with flexible flange according to FIG. 3.

FIG. 4 shows flexible flange 380 in detail. The same components as in FIG. 3 are assigned the same reference numbers. FIG. 4 does not show the width of the flexible flange as in FIG. 3, but instead shows thickness $D_E$, that is, the wall thickness of the sheet metal section into which the sealing takes place. Wall thickness $D_E$ can be compared with sheet thickness $D_2$ of the second section; here too, according to the present invention, width W is greater than wall thickness $D_E$.

FIG. 5 shows an arrangement of an embodiment of the present invention with flexible flange 1380, wherein flexible flange 1380 for wall thickness has the same thickness as the sheet metal part, namely $D_2$. Flexible flange 1380 is obtained by bending the sheet metal with thickness $D_2$. The flexible flange includes a collar which is also formed by bending, into which the sealing takes place. As shown in FIG. 5, width W extends from the region of the ring in which sealing into glass material 22 occurs, to the region of flexible flange 1380 analogous to FIG. 3. If the flexible flange is made of a ferritic material, prestressing is not sufficient to provide a reliable compression seal, especially in the case of thin wall thicknesses of the metal sheet section in which sealing occurs, since in such a case prestressing is not sufficient.

Figure 6:
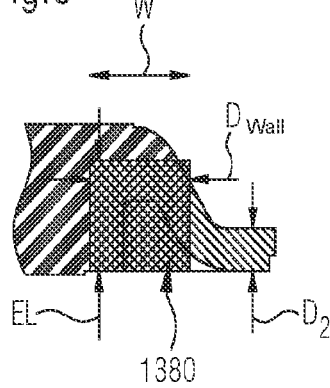
FIG. 6 housing part with a flexible flange according to FIG. 5, wherein the necessary seal length EL is specified, for example for ferritic high grade steel.

In order to provide such a compression seal, especially with steel as material, a wall thickness $D_{Wall}$ would be necessary over the entire seal length EL, as shown in FIG. 6, which essentially corresponds to width W. This large wall thickness of the metal ring is required to exert a permanent prestress on the glass. As can be seen from FIG. 6, wall thickness $D_{Wall}$ is significantly greater than metal sheet thickness $D_2$. The steel, in particular the mild steel, has a coefficient of expansion in the range 12 to $13 \cdot 10^{-6}$ $K^{-1}$.

Figure 7:
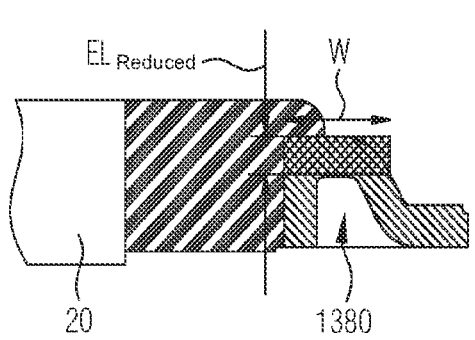
FIG. 7 housing part with a flexible flange according to FIG. 5, wherein the necessary sealing length EL is specified, for Duplex high grade steel or austenitic high grade steel.

Surprisingly, it has been shown that when using an austenitic high grade steel material with a thermal coefficient of expansion α in range of 16 to $18 \cdot 10^{-6}$ $K^{-1}$ or a Duplex high grade steel material with a thermal coefficient of expansion α in the range of 13 to $14 \cdot 10^{-6}$ $K^{-1}$, it is possible to provide a secure compression seal with sufficient prestress force if a pressure is not applied over the entire seal length EL as shown in FIG. 6, but instead only over a reduced seal length $EL_{reduced}$, which substantially corresponds to sheet metal thickness $D_2$ of the sheet metal part, as shown in FIG. 7. Same components from FIG. 5 and FIG. 6 are identified with the same reference numbers. Width W of the region which applies the pressure upon the glass material is shown in FIG. 5 and FIG. 6 and extends into the region of the flexible flange. It is, however, disadvantageous that, due to the high pressure of the austenitic material in the region of the pressure seal which—as shown in FIG. 6—is a raised seal, fissures appear in the glass material.

For a compression seal with a design with flex-flange 1380 according to FIGS. 5, 6 and 7, a deep-set compression seal is thus advisable. This would result in fewer glass fissures. This is achieved by use of a Duplex high grade steel in the form of a deep-set compression seal. With the Duplex material, the prestress on the glass is less than when using austenitic high grade steel, and thus also the differential pressure between the prestress and the external glass zone, resulting in that the risk of glass fissures is reduced.

With the selection of the various ring materials or respectively materials for the flex-flange into which sealing occurs, the expulsion force of the pin or conductor can be influenced by the different glass pre-stresses which act via the glass also upon the pin or conductor. This influence can be used to set a safety vent function of the pin or conductor, in other words, opening of the battery in the event of battery overpressure in the case of damage.

Additional control possibilities to influence the opening force of the sealed in pin or conductor, would be to change the thickness of the seal, use of different glass materials, use of glass materials with different bubble content in the glass, structuring of the glass surface through the shape of the glass part prior to sealing, structuring of the glass surface through the shape of the glass part during sealing, structuring of the glass surface through laser treatment after sealing. Structuring of the glass surface can occur, for example, through introduction of one or several notches and/or taper.

Such a safety vent function can also be achieved by notches and/or tapers of the sealed-in pin and/or the base body. The aforementioned measures can be carried out individually or in combination. The introduction of structuring, especially of notches and/or tapers can occur on one side of the housing part or base body with a top and bottom side in the glass, housing part and/or conductor, or on both sides, in other words on the top side as well as the bottom side, that is on both sides.

The advantage of structuring the glass material for a safety vent function is, that the glass as a formed body is precisely dimensioned, so that the trigger point of the safety vent function can be regulated very precisely. It is optional, if for the safety vent function a groove is introduced into the glass material by way of laser. It is then possible, independently of the glass density and/or thickness of the base body, therefore of the ring thickness, to specifically set an expulsion force for the conductor and thus the trigger point.

The ejection force or expulsion force for the conductor can also be influenced by the length of the seal and/or the formation of menisci.

With the aid of the safety vent function of the conductor, it is possible in particular to set an opening of a storage device, in particular a battery in the event of overpressure in case of damage.

In addition to the previously described measures, the expulsion force and thus the safety vent function of the conductor can be adjusted through one or several of the measures described below:

Thickness of seal;

Use of different glass materials;

Different bubble content in glass;

A structured glass surface through the shape of the glass part prior to sealing;

A structured glass surface through the shape of the glass part during sealing;

A structured glass surface through laser treatment after sealing;

Notches or tapers in glass material, on one or both sides;

Length of seal and formation of menisci.

FIG. 8 shows an electrical device according to the present invention, especially a microbattery with an inventive feed-through or respectively housing part with an opening. The electrical device or respectively microbattery is identified with reference number 10000. The feedthrough or respectively the housing part with opening 1 is designed as in FIG. 3 and FIG. 4. Same components of the feedthrough as in FIG. 3 and FIG. 4 are identified with the same reference numbers in FIG. 5. The battery cover with sheet metal part 1 and flexible flange according to FIGS. 3 and 4 is tightly connected in region 1504 as part of the housing, with a weakened protrusion 10001 with remaining flange 10001 of the housing of the electrical device or respectively the microbattery by way of welding, in particular laser welding. A terminal lug 1400 is connected to conductor 20 which is sealed into opening 3 of the feedthrough in a glass material 22. The battery in housing 10010 is electrically connected via terminal lug 1400, which protrudes into housing 10010. The pressure-tight connection of the housing cover with opening 3 as part of the feed-through with the rest of the housing of the battery, which is designed in cylindrical form and directly adjoins the feed-through, can be made by welding. The welding occurs optionally between the sheet metal part with opening as part of the feedthrough and the optionally cylindrical housing part which accommodates the battery in the region of tip 1504 of the sheet metal part. The height of the region welded to the tip 1504 is at most 5 mm, optionally at most 3 mm, in particular it is in the range 1 mm to 5 mm and determines the height of the microbattery. Pressure-tight means that the He leakage rate is less than $10^{-8}$ mbar l/sec at 1 bar pressure difference. Due to the flexible flange, which is designed as shown in FIGS. 3 and 4, sufficient elasticity is achieved even after welding of the feedthrough in the housing or respectively with the remaining housing part and the therefrom resulting temperature effect. To isolate the flexible flange from inner conductor 20, the feedthrough shown in FIG. 5 includes an isolation ring 10030 made for example of a glass material, covering seal 22, and the flexible flange consisting of metal.

Due to the compact feedthrough the height of the entire microbattery is 5 mm at most, optionally no more than 3 mm, in particular in the range of 1 mm-5 mm. The dimensions in the region of the sheet metal part as a part of the feedthrough with flexible flange according to FIGS. 3 and 4 are as follows. The diameter of conductor 20 is 1 mm to 2 mm, optionally 1.5 mm. The diameter of opening 3 is in the range of 1 mm to 4 mm, optionally 2.5 mm to 3.0 mm. In the current example, an insulation is achieved between terminal lug 1400 and the sheet metal part of the feedthrough by way of insulation ring 10030. Alternatively to an insulation ring, effervescent glass can also be used, for example. The area covered by the glass material for insulation is in the range of 0.2 mm. The width of the entire sheet metal part as part of the feedthrough which is introduced into the housing is between 4.0 mm and 6.0 mm, optionally 4.5 mm. The embodiment according to FIG. 5 is characterized in that a surface of a partial surface 1052 of the housing part is covered by an inorganic material, in particular a glass material or a glass ceramic material, in order to provide an electrical insulation for example, for a 1400 terminal lug with respect to the housing in the case of the introduced feedthrough.

Whereas FIG. 8 shows the contacting of a conductor inside the microbattery by way of a bent terminal lug 1400, as shown in FIG. 8, FIG. 9a shows a conductor with an external connection. Conductor 20 includes a head or terminal head 20000 arranged on the conductor and consisting of a metallic material, optionally the same material as the conductor. The head is optionally round with a diameter in the range of 8 to 15 mm. The diameter of the conductor which is generally round is in the range of 4 mm to 8 mm. The diameter of the opening is 6 mm to 10 mm. The sealed in conductor 20 is connected to an electrical device not shown, with connecting head 20000 consisting of a metallic material. Optionally, the conductor and connecting head 20000 are integral, in other words, the connecting head can be obtained by expansion during pressing. To prevent a short circuit between connecting head 20000 of conductor 20 and sealing ring 10 of the battery cover, which also consists of a metallic material, an insulating element, in particular an insulating washer 20010, optionally made of a glass or glass-ceramic material, a ceramic or a non-conductive organic material, is provided.

FIG. 9b again shows a housing part with sealing ring 10 and sealed-in conductor 20 with terminal head 20000 and insulating washer 20010. It can be clearly seen that insulating washer 20010 extends to conductor 20 and electrically insulates the entire terminal head 20000 from sealing ring 10. The same components as in FIG. 6a are identified with the same reference numbers.

Figure 10A:
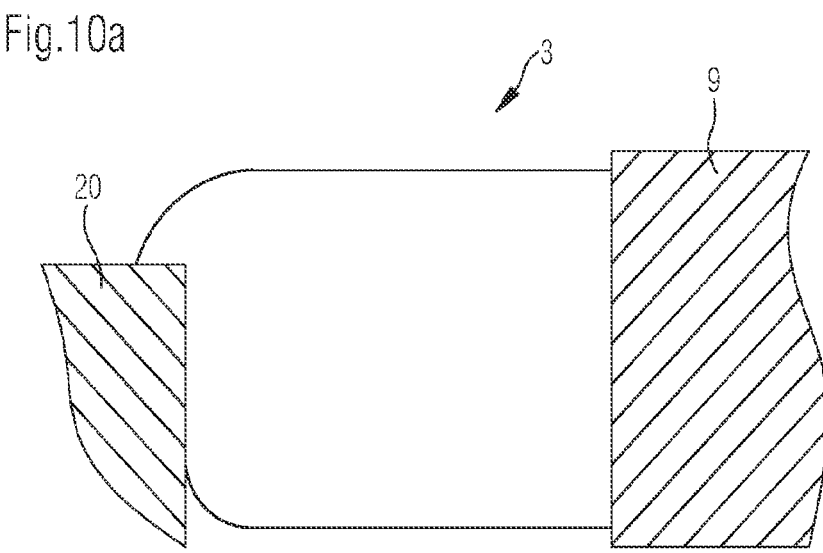
FIG. 10a conductor, sealed into an opening in a housing part, in particular base body without meniscus of the glass or glass ceramic material to the housing part, in particular the base body.
Figure 10B:
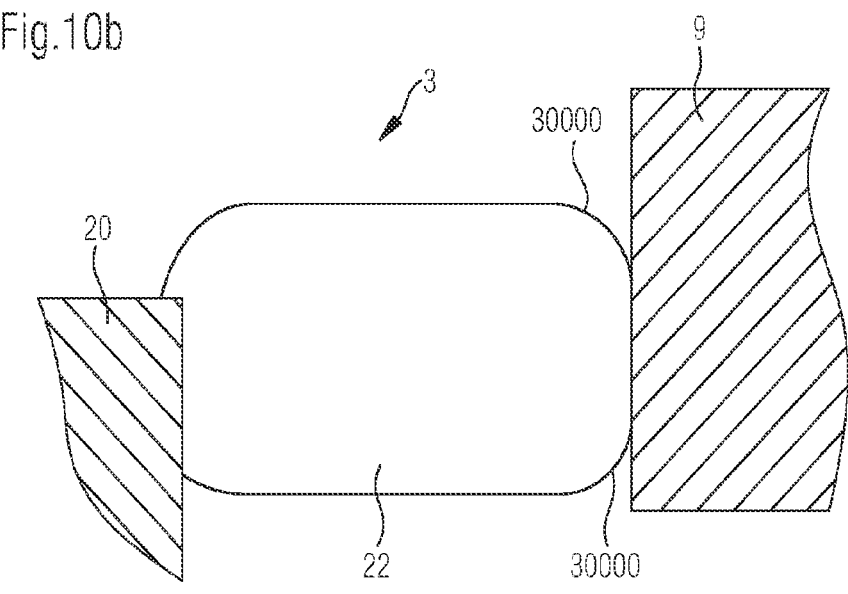
FIG. 10b conductor, sealed into an opening in a housing part, in particular base body with a meniscus of the glass or glass ceramic material to the housing part, in particular the base body.

FIG. 9c shows is top view of sealing ring 10 in a round shape with a sealed-in conductor with connection head 20000. As can be seen from FIG. 9c, connecting head 20000 covers between 60% and 90%, optionally 70% to 85%, of the area of the opening of sealing ring 10. Sealing ring 10 is equivalent to the previously described housing part with opening, that is, the sealing ring has a coefficient of expansion $\alpha_3$ which is always greater than the coefficient of expansion $\alpha_2$ of the glass material. Sealing ring 10 can also be referred to as the base body into which sealing occurs. FIGS. 10a to 10b show in detail sealing of a conductor 20 into an opening 3 of a housing part, in particular a base body, optionally a sealing ring 9, as illustrated in FIG. 1b. In the arrangement according to FIG. 10a, the sealing takes place over a longer length than in FIG. 10b, so that no meniscus is formed from the glass or glass ceramic material to the housing part, in particular the base body, optionally sealing ring 9. The design of a seal without meniscus results in that practically no fractures occur in the glass material. Furthermore, a high expulsion force of the sealed-in conductor is provided.

In contrast, FIG. 10b shows an embodiment of the present invention in which a meniscus is formed in the glass material to the housing part or base body or sealing ring 9. The meniscus is identified by reference number 30000, the glass or glass ceramic material by reference number 22. The meniscus is formed because the seal length is short compared to FIG. 9a. When sealing with a meniscus, the number of fractures increases compared to the case where no meniscus is formed in the glass material. The formation of a meniscus greatly reduces the expulsion resistance of the sealed in metal pin, in particular the conductor, compared with sealing without a meniscus. In summary, it can be stated that sealing, whereby the formation of a meniscus is avoided, on the one hand reduces the probability of glass breakage and on the other hand increases the expulsion resistance. In general, the thinner the base body in which sealing occurs, the stronger the effect of the meniscus. In general, the longer the seal length, the higher the expulsion forces since no meniscus is then formed.

The feedthrough according to the present invention is used in particular for housings of electrical storage devices, in particular batteries or capacitors. With very flat feedthroughs according to the present invention for an electrical storage device, an electrical storage device can be provided having a maximum height of 5 mm.

By compression sealing the conductor into the glass material a hermetically sealed feedthrough is provided.

In particular, in the use of a flex-flange design in a compression seal a greater pin or conductor contact pressure is achieved, in particular when using Duplex high grade steel or austenitic steel. The flex-flange design as a compression seal is moreover mechanically more reliable and displays greater expulsion forces for the sealed-in conductor than conventional seals.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An electrical device, comprising:
   a housing part of a housing, the housing part being made of a metal and including a feedthrough therethrough, at least one opening as a part of the feedthrough, a first region, and a second region, the metal of the housing part being iron, an iron alloy, an iron-nickel alloy, an iron-nickel-cobalt alloy, KOVAR, steel, or stainless steel, the at least one opening extending about an axis, the first region including the at least one opening, the second region being adjacent to the at least one opening, the at least one opening receiving a conductive material or a conductor in a glass material or a glass-ceramic material, wherein the conductive material has a first coefficient of expansion $\alpha_1$, the glass material or the glass-ceramic material has a second coefficient of expansion $\alpha_2$, and the housing part has a third coefficient of expansion $\alpha_3$, the third coefficient of expansion $\alpha_3$ being always greater than the second coefficient of expansion $\alpha_2$, wherein:

(i) the housing part includes a flexible flange, the flexible flange having a free space F between a raised region or a lowered region of the housing part and having a connecting region; or (ii) the first region including a width W that is substantially perpendicular to the axis of the at least one opening, the width W of the first region being always greater than a thickness $D_2$ and a thickness $D_E$ of the second region; or (iii) a combination of (i) and (ii).

2. The electrical device according to claim 1, wherein the housing part includes the flexible flange, wherein the first region includes the width W, wherein the flexible flange is connected to the housing.

3. The electrical device according to claim 1, wherein the flexible flange is connected to the housing by way of welding or laser welding or soldering, in such a manner that a connection therebetween is substantially gas-tight and that a helium leakage rate of less than 10-8 mbar 1/sec is provided.

4. The electrical device according to claim 1, wherein the flexible flange is produced by reshaping of a sheet material part, wherein the flexible flange has a thickness $D_2$ of the sheet material part.

5. The electrical device according to claim 1, wherein the flexible flange consists of one of the following materials:

a ferritic steel with a coefficient of expansion in a range of 10 to 12·10-6 K–1;

a steel with a coefficient of expansion in a range of 12 to 13·10-6 K–1;

a Duplex steel with a coefficient of expansion in a range of 13 to 14·10-6 K–1;

an austenitic steel with a coefficient of expansion in a range of 16 to 18·10-6 K–1.

6. The electrical device according to claim 1, wherein:

(i) the thickness $D_2$ and the thickness $D_E$ are in a range of 0.1 mm to 1 mm or 0.1 mm to 0.6 mm; or (ii) the width W is in a range of 0.6 mm to 1 mm or in a range of 0.7 mm to 0.9 mm; or (iii) a combination of (i) and (ii).

7. The electrical device according to claim 1, wherein at least one of:

the third coefficient of expansion $\alpha_3$ is in a range of 12·10-6 1/K to 19·10-6 1/K;

the second coefficient of expansion $\alpha_2$ is in a range of 9·10-6 1/K to 11·10-6 1/K; and the first coefficient of expansion ai is in a range of 6·10-6 1/K to 11·10-6 1/K.

8. The electrical device according to claim 1, wherein at least one of a metal of the housing and a metal of the conductor is iron, an iron alloy, an iron-nickel alloy, an iron-nickel-cobalt alloy, KOVAR, steel, stainless steel, aluminum, an aluminum alloy, AlSiC, magnesium, a magnesium alloy, copper, a copper alloy, titanium, or a titanium alloy.

9. The electrical device according to claim 1, wherein the housing part in the first region in a region of the at least one opening comprises a collar, thereby forming an inside wall having a height that is greater than a material thickness or the thickness $D_2$.

10. The electrical device according to claim 9, wherein the collar is domed or reshaped with at least one of an indentation and a protrusion.

11. The electrical device according to claim 9, wherein a glassing length EL of the glass material or the glass-ceramic material is determined by a height of the collar.

12. The electrical device according to claim 9, wherein the material thickness or the thickness $D_2$ of the second region is equal to a material thickness or a thickness of at least one of at least a component elected from the collar, an indentation of the collar, and a protrusion of the collar.

13. The electrical device according to claim 1, wherein the electrical device has a total height which is in a range of 1 mm to 40 mm.

14. The electric device according to claim 1, wherein a material of the flexible flange is selected such that an expulsion force of the conductor is set by glass pre-stresses which act via the glass material upon the conductor.

15. The electrical device according to claim 14, wherein by adjustment of the expulsion force of the conductor a safety vent function of the conductor is set.

16. The electrical device according to claim 1, wherein an expulsion force of the conductor and a safety vent function of the conductor is set by at least one of the following measurements:

a thickness of a glassing;

using different ones of a plurality of glass materials;

a different bubble content in a glass;

a structured glass surface based on a shape of a glass part prior to sealing;

a structured glass surface based on a shape of a glass part during sealing;

a structured glass surface through a laser treatment after sealing;

a plurality of notches or a plurality of tapers in the glass material, on one or both sides of the housing;

a plurality of notches or a plurality of tapers in at least one of the conductor, the housing, the housing part, and a base body of the housing.

17. The electrical device according to claim 1, wherein the electrical device is an electrical storage device or a sensor housing.

18. The electrical device according to claim 1, wherein the electrical device is a battery or a condensator.

* * * * *